United States Patent
Michelson

(12) 
(10) Patent No.: US 6,446,909 B1
(45) Date of Patent: Sep. 10, 2002

(54) RECIPROCATING CHEMICAL MUSCLE (RCM) AND METHOD FOR USING SAME

(76) Inventor: Robert C. Michelson, 454 Mondi Dr., Woodstock, GA (US) 30188

( * ) Notice: Subject to any disclaimer, the term of this patent is extended or adjusted under 35 U.S.C. 154(b) by 0 days.

(21) Appl. No.: 09/686,756

(22) Filed: Oct. 10, 2000

Related U.S. Application Data

(63) Continuation-in-part of application No. 09/062,132, filed on Apr. 17, 1998.
(60) Provisional application No. 60/044,741, filed on Apr. 18, 1997.

(51) Int. Cl.$^7$ ................................................. B64C 33/02
(52) U.S. Cl. ....................... 244/72; 244/53 R; 342/118; 417/392
(58) Field of Search ............................... 60/200.1, 229, 60/271, 204, 508, 509, 512, 514, 515; 244/22, 23 R, 53 R, 60, 62, 72, 169, 172, 198, 207; 417/473, 381, 394; 429/13; 342/118, 137

(56) References Cited

U.S. PATENT DOCUMENTS

| | | | |
|---|---|---|---|
| 3,015,210 A | * | 1/1962 | Williamson et al. .......... 60/229 |
| 3,731,877 A | | 5/1973 | Nekrasov et al. |
| 3,740,945 A | * | 6/1973 | Lovingham .................. 60/204 |
| 3,882,223 A | | 5/1975 | Reinhardt |
| 3,887,696 A | | 6/1975 | Bernard et al. |
| 3,917,461 A | | 11/1975 | Kuhl et al. |
| 4,157,270 A | | 6/1979 | Martignoni |
| 4,220,006 A | | 9/1980 | Kindt |
| 4,449,698 A | | 5/1984 | Renato |
| 4,488,951 A | | 12/1984 | Nolan et al. |
| 4,792,435 A | | 12/1988 | Nakajima |
| 4,861,560 A | | 8/1989 | Nakajima |
| 4,930,310 A | * | 6/1990 | McKevitt ..................... 60/271 |
| 5,141,412 A | * | 8/1992 | Meinz ......................... 417/473 |
| 5,308,230 A | | 5/1994 | Moore |
| 5,665,316 A | | 9/1997 | Salonia et al. |
| 5,753,383 A | * | 5/1998 | Cargnelli et al. ............. 429/13 |
| 6,082,671 A | * | 7/2000 | Michelson ................... 244/72 |
| H1948 H | * | 3/2001 | Rusek et al. |
| 6,250,078 B1 | * | 6/2001 | Amendola et al. ............ 60/509 |
| 6,255,009 B1 | * | 7/2001 | Rusek et al. ................. 429/13 |

* cited by examiner

Primary Examiner—Thomas Denion
Assistant Examiner—Tu M. Nguyen
(74) Attorney, Agent, or Firm—Thomas, Kayden, Horstemeyer & Risley, LLP

(57) ABSTRACT

A preferred apparatus for generating power from a non-combustive chemical reaction with the power being sufficient to enable motion of the apparatus includes a reaction chamber containing a catalyst that is configured to receive monopropellant fuel. The catalyst is chemically reactive with the monopropellant fuel so that, in response to a fuel metering device providing the fuel to the reaction chamber, a chemical reaction occurs which produces heat and gas. Additionally, a reciprocating motion-producing mechanism is provided that is configured to generate reciprocating motion from the heat and gas so as to enable motion of the apparatus. Thereafter, at least a portion of the remaining heat and gas may be utilized to influence a motion characteristic of the apparatus, such as during flight. Methods also are provided.

16 Claims, 17 Drawing Sheets

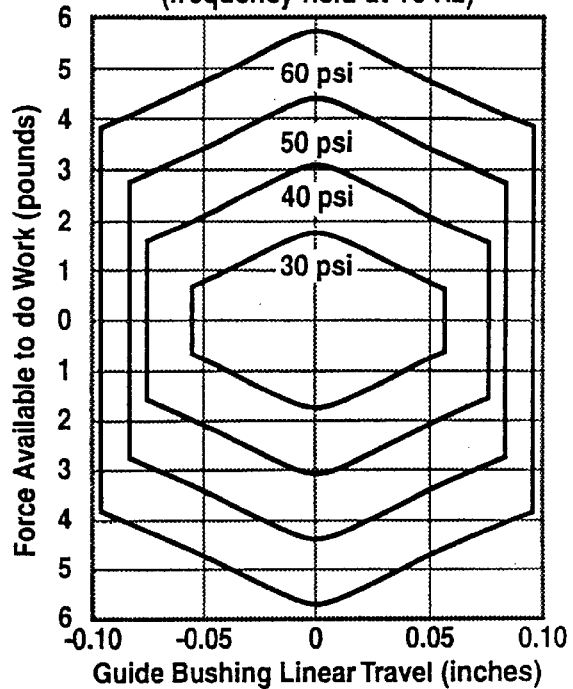
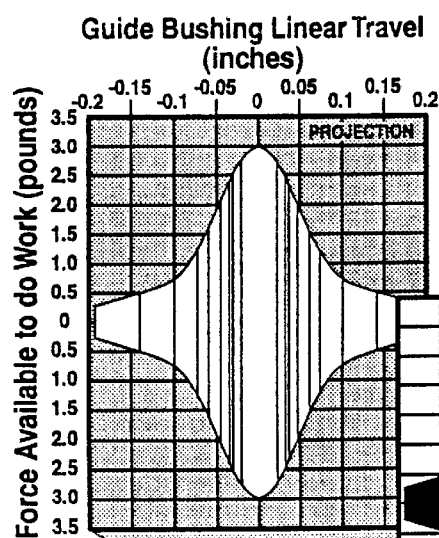
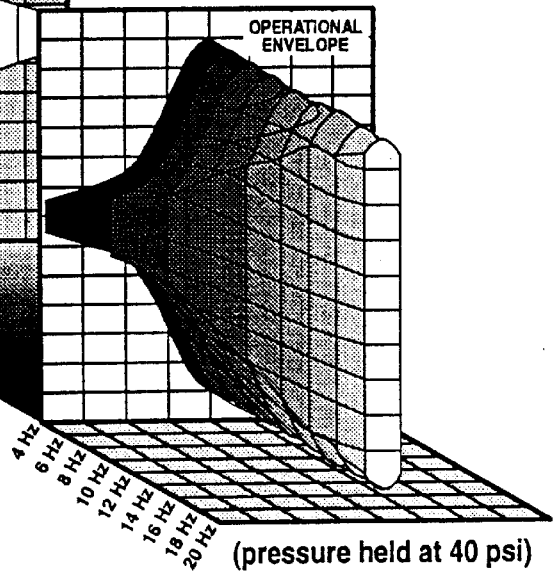
FIG. 5A
FIG. 5B
COMPARISON OF AVAILABLE FORCE FOR DIFFERENT MUSCLE OPERATING FREQUENCIES

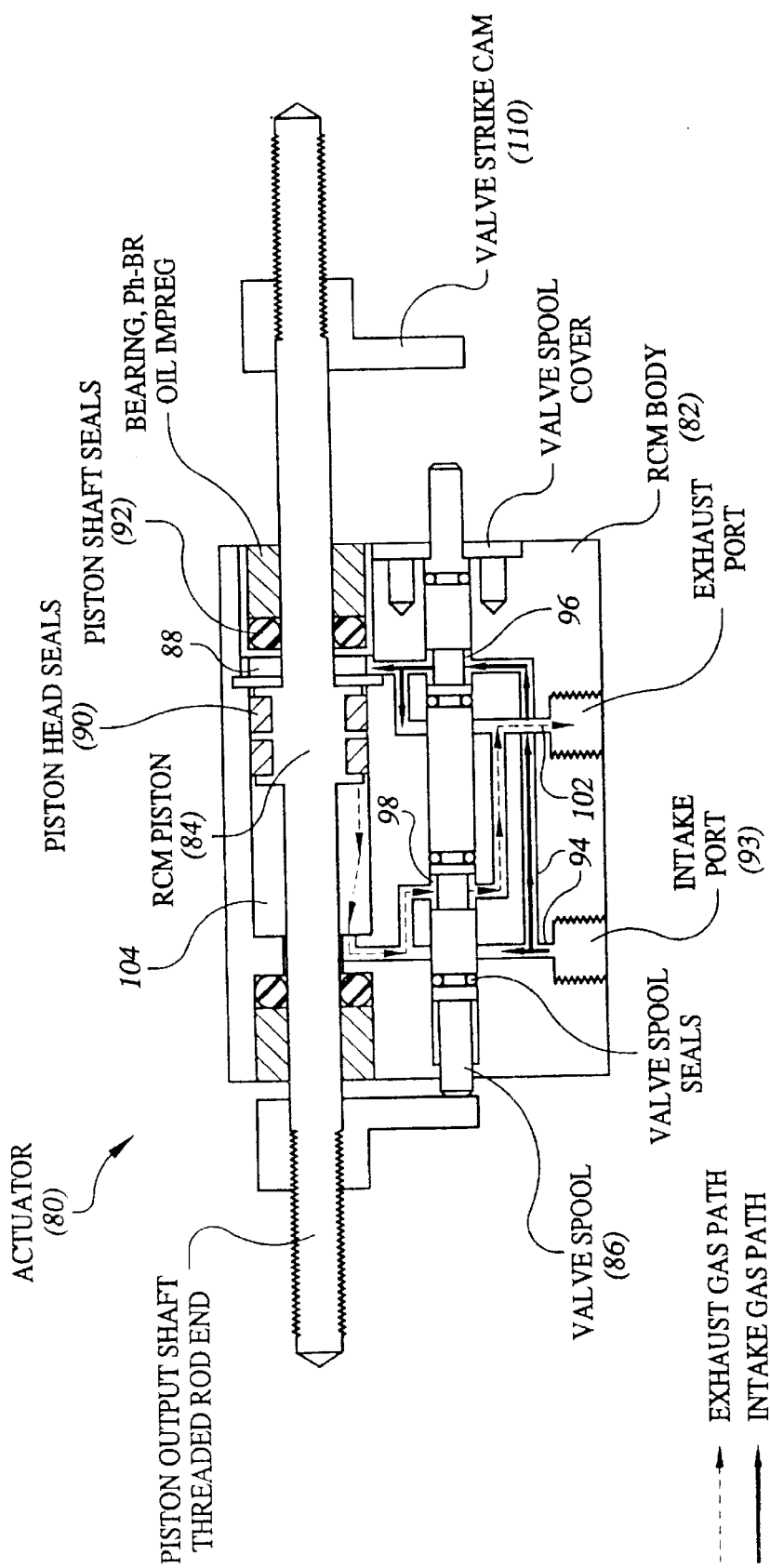

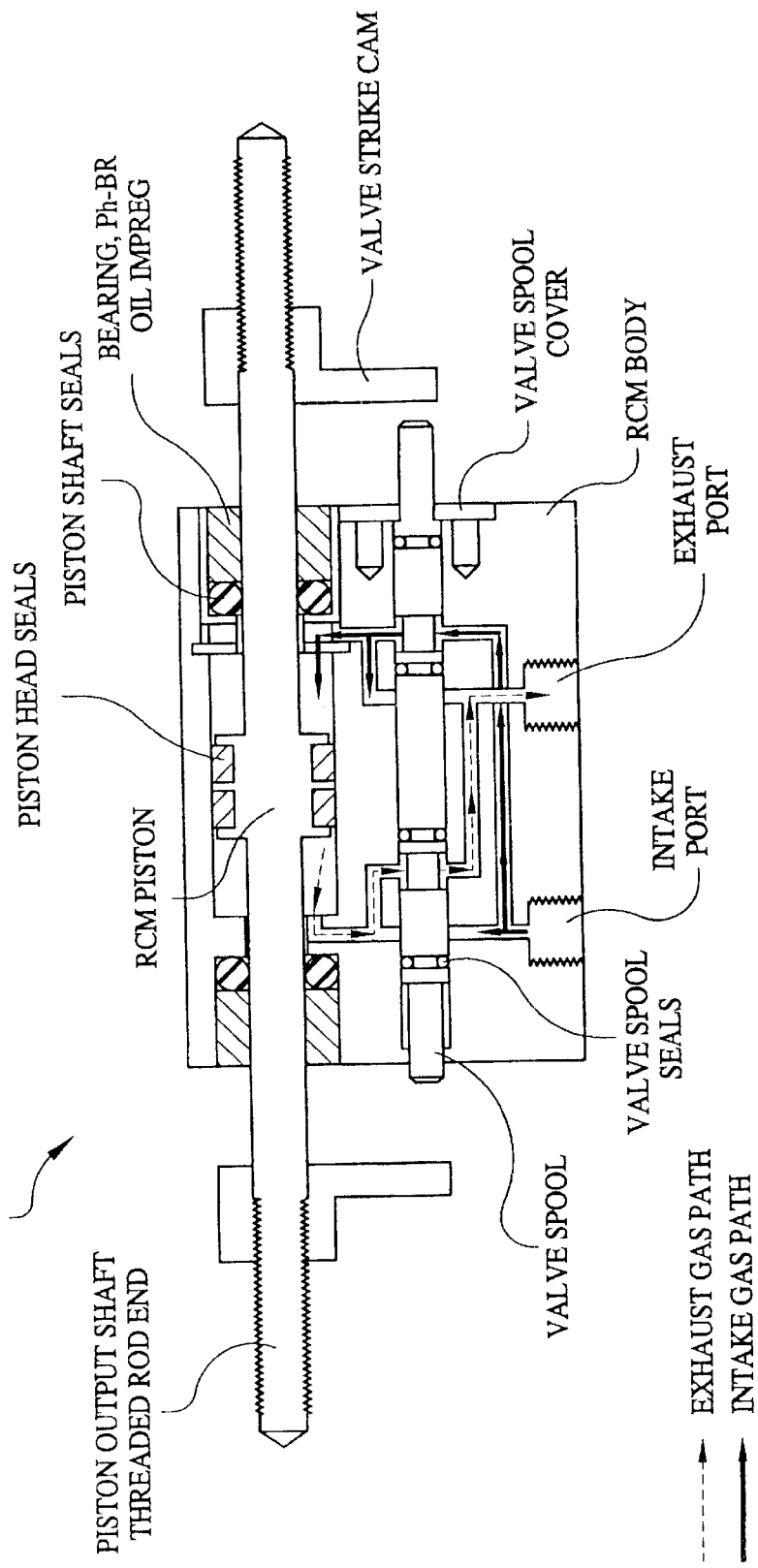

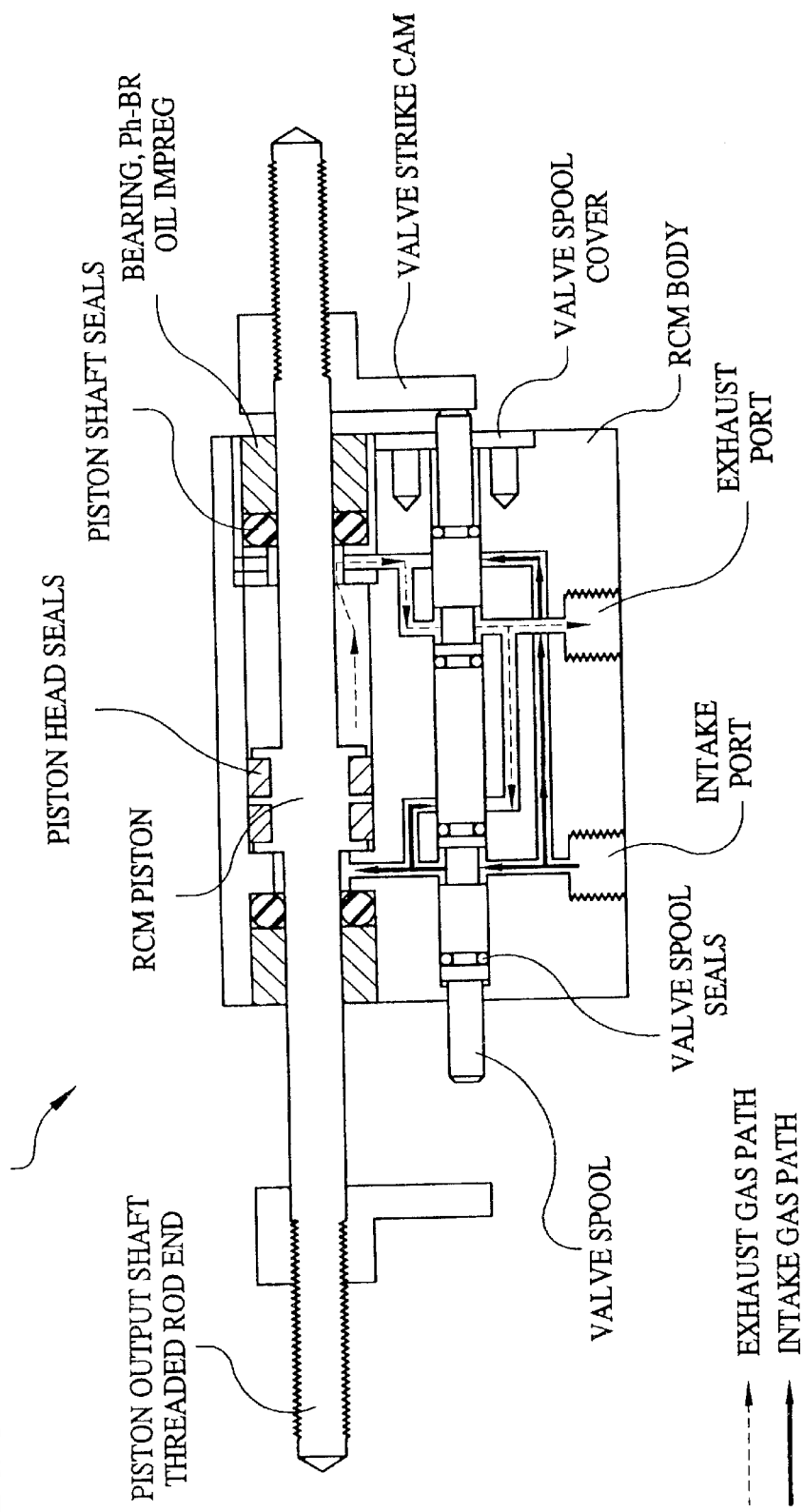
FIG.8C ACTUATOR
CYCLE 2

RIGHT TIP VIEW

RECIPROCATING CHEMICAL MUSCLE (RCM) AND METHOD FOR USING SAME

CROSS REFERENCE TO RELATED APPLICATIONS

The present application is a Continuation-in Part application which claims the benefit of and priority to U.S. patent application Ser. No. 09/062,132, filed on Apr. 17, 1998, which claims the benefit of and priority to U.S. Provisional Patent Application Ser. No. 60/044,741, filed on Apr. 18, 1997, which are incorporated by reference herein.

BACKGROUND OF THE INVENTION

1. Field of the Invention

The present invention generally relates to the field of power generation and, in particular, to a reciprocating chemical muscle (RCM) that is capable of converting chemical energy into power through a direct noncombustive chemical reaction.

2. Description of the Related Art

The development of micro air vehicles (MAVs) has emphasized the need for compact energy sources having a very high energy density. MAVs are generally thought of as miniature flying machines having no dimension greater than 15 cm. Current energy sources are not well suited for such applications. Internal combustion engines require ignition systems and oxygen to operate. Such engines suffer from problems of energy conversion efficiency and pollution, and cannot be operated in explosive atmospheres or oxygen-starved environments. They are also mechanically complex and do not scale well to the sizes envisioned for MAVs.

Similarly, electric motors are limited in endurance by the energy density of current storage batteries or fuel cells. Though electrical sources are generally the obvious first choice for use in tiny robotic systems, the energy density of an electrical storage medium is soon found to be inadequate. Chemical energy densities currently excel over batteries. For example, more energy can currently be extracted from a drop of gasoline than from a battery the size of a drop of gasoline. Specifically, one gram of petroleum provides 13.1 watt-hours of power whereas a one gram lithium battery can only provide 0.3 watt-hours of power. If a battery of sufficient endurance is used, the sheer size of the battery becomes a significant impediment to MAV flight.

Therefore, there is a need for improved systems, devices and methods which address these and other shortcomings of the prior art.

SUMMARY OF THE INVENTION

Briefly described, the present invention relates to the conversion of chemical energy into power through a direct noncombustive chemical reaction. In this regard, embodiments of the present invention may be construed as providing an apparatus for generating power from a noncombustive chemical reaction with the power being sufficient to enable motion of the apparatus. In a preferred embodiment, the apparatus includes a reaction chamber containing a catalyst that is configured to receive monopropellant fuel. The catalyst is chemically reactive with the monopropellant fuel so that, in response to a fuel metering device providing the fuel to the reaction chamber, a chemical reaction occurs which produces heat and gas. Additionally, a reciprocating motion-producing mechanism is provided that is configured to generate reciprocating motion from the heat and gas so as to enable motion of the apparatus. Thereafter, at least a portion of the remaining heat and gas may be utilized to influence a motion characteristic of the apparatus, such as during flight. For instance, when such motion is flight, such a flight characteristic may include, but is not limited to thrust, drag, lift, roll, pitch, and yaw, among others.

Other embodiments of the present invention may be construed as providing methods for producing power through a noncombustive catalytic reaction and utilizing the power for enabling motion of an apparatus. A preferred method includes: controllably metering a monopropellant fuel into a reaction chamber, where a chemical reaction between the monopropellant fuel and a catalyst produces heat and gas; utilizing at least a portion of the heat and gas to produce reciprocating motion; transmitting the reciprocating motion to a propulsor so that the propulsor generates motion of the apparatus; utilizing at least a portion of the heat and gas to produce acoustic waves; directing the acoustic waves toward an object external to the apparatus; and altering a motion characteristic of the apparatus in response to a determined range of the object, the range of the object being determined by analyzing the acoustic waves.

The numerous features and advantages of the present invention will become apparent to one with skill in the art upon examination of the drawings and the following detailed description. Any and all additional features and advantages which may become apparent are intended to be included herein within this disclosure.

BRIEF DESCRIPTION OF THE SEVERAL VIEWS OF THE DRAWINGS

FIGS. 5A–5B are graphs illustrating the range of operation of an RCM of the present invention, predominantly as a function of the operating pressure and frequency of reciprocation.

FIGS. 8A through 8C are schematic diagrams illustrating a third embodiment of an RCM of the present invention.

DETAILED DESCRIPTION OF THE PREFERRED EMBODIMENTS

Figure 1:
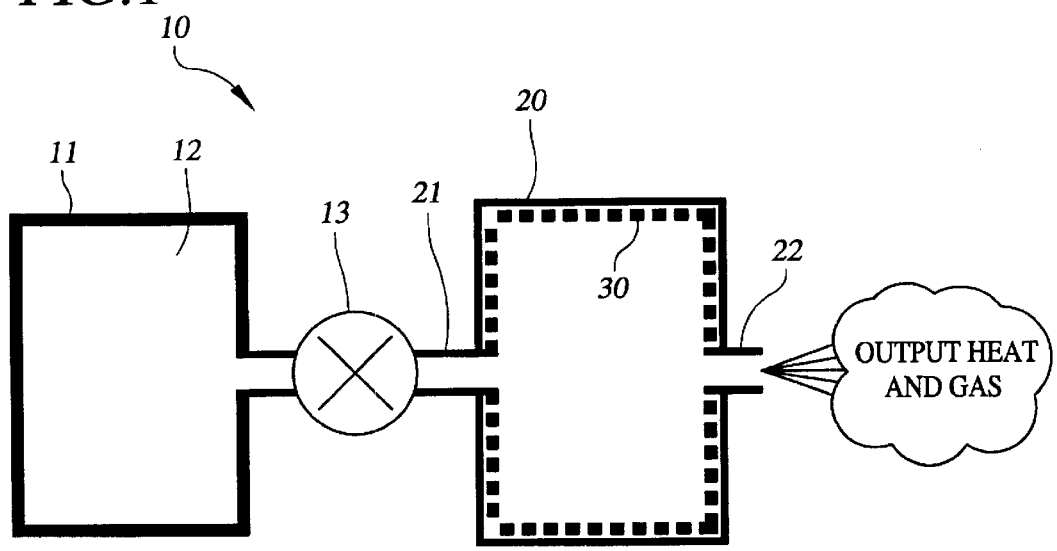
FIG. 1 is a schematic diagram of a first embodiment of the gas production portion of an RCM of the present invention.

With reference now to the drawings, wherein like reference numerals designate corresponding parts throughout the several views, FIG. 1 illustrates a first embodiment of an RCM 10 of the present invention. In this embodiment, a fuel storage vessel 11 containing a monopropellant 12 is connected through a metering device 13 into a reaction chamber 20 having an input port 21 and an output port 22. The reaction chamber 20 contains a catalyst 30 that is reactive with the monopropellant 12.

A monopropellant is a chemical which breaks down to primary constituents and heat when it comes in contact with various catalytic materials. Monopropellants of interest for use in the RCM rapidly decompose exothermically from a liquid into gases. No ignition source is involved in the process, and no oxidizer is necessary.

The monopropellant 12 is metered through the metering device 13 into the input port 21 of the reaction chamber 20. Unless the fuel storage vessel 11 is pressurized, a fuel pump (not shown) will be needed to pump the monopropellant 12 through the metering device 13. The efficiency and reliability of the RCM is dependent on the ability accurately to meter the monopropellant 12 into the reaction chamber 20. The metering device 13 may be a valve or other metering device which is calibrated to open only for such time as is necessary to allow a desired amount of fuel to enter the reaction chamber 30. The metering device 13 is closed as soon as the fuel is delivered.

When the monopropellant 12 comes into contact with the catalyst 30, the monopropellant 12 rapidly decomposes noncombustively into heat and gas, which exits the reaction chamber 20 through the output port 22.

For the monopropellant hydrogen peroxide ($H_2O_2$) in concentrations greater than 70%, the gas produced by the decomposition is on the order of 1000 times the volume of the initial non-catalyzed monopropellant. The reaction is exothermic, the temperatures generated being a function of the concentration and purity of the monopropellant and ranging from 100° C. to as high as 700° C. Other monopropellants such as hydrazine ($H_2NNH_2$), reacting with various catalysts, can be even more energetic. The heat and the gas volume generated in the reaction power the RCM. The power output of the RCM is regulated by controlling the flow rate of the monopropellant 12 into the reaction chamber 20. The RCM may be used as a power source for such external devices as pistons and bellows by connecting the output of the RCM to such devices using conventional means.

Although an ideal RCM would produce an output that is 100% gas and heat, the RCM actuator may not extract all of the heat and pressure from the gas and heat produced through the monopropellant decomposition. After an initial propulsive use of the products of fuel decomposition, the gas expelled from the RCM actuator still contains potential energy. These products can be in gaseous form and, under certain conditions, may be in the form of liquids condensing in the base of the reaction chamber. For example, hydrogen peroxide ($H_2O_2$) will produce $H_2O$ in liquid form (i.e., water) if the catalytic reaction does not generate enough exothermic heat to maintain the $H_2O$ in gaseous form (i.e., steam), as is the case for hydrogen peroxide monopropellants having concentrations of less than 70% purity. Waste product condensate should be removed from the reaction chamber periodically to prevent the efficiency of the reaction from being diminished through dilution or obscuration of the catalyst surface.

The gases formed during the catalytic reaction are used to perform work by virtue of the pressures created when the gas produced is confined. At some point however, the gas must be released to prevent overpressurization or to release a mechanical device such as a piston when a unit of useful work has been completed. This gas, termed "waste gas", can then be used to perform other tasks as it is vented, or alternately, it can simply be allowed to escape unused.

Figure 2:
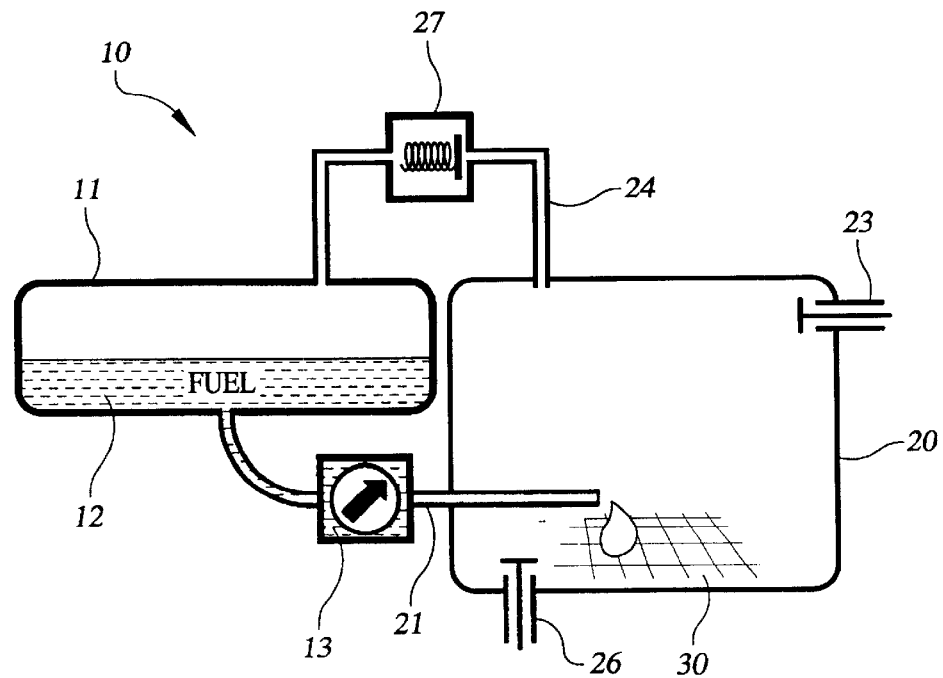
FIG. 2 is a schematic diagram of a second embodiment of the gas production portion of an RCM of the present invention.

FIG. 2 illustrates a second embodiment of a reciprocating motion-producing mechanism or RCM 10 of the present invention, which produces power in much the same way as the first embodiment, while also providing for the elimination of waste products. In this embodiment, a pressurized fuel storage vessel 11 containing a monopropellant 12 is connected through a metering device 13 into a reaction chamber 20 having an input port 21, a gas exhaust port 23, a feedback port 24, and a liquid exhaust port 26. The reaction chamber 20 contains a catalyst 30 that is reactive with the monopropellant 12.

The monopropellant 12 is metered through the metering device 13 into the input port 21 of the reaction chamber 20. When the monopropellant 12 comes into contact with the catalyst 30, the monopropellant rapidly decomposes in a noncombustive catalytic reaction in which the liquid monopropellant disassociates exothermically into gases.

In this embodiment, the reaction chamber 20 is constructed of a flexible material with an elastic memory. The useful gas and heat do not exit the reaction chamber, but instead are used to expand the reaction chamber itself during each cycle of the reaction. The reaction chamber thus functions similarly to a bellows, which can be used to power external devices through conventional means.

The pressurization of the reaction chamber also is used to pressurize the fuel storage vessel 11 though the feedback port 24, thereby providing positive flow control of the monopropellant 12 through the metering device 13 into the reaction 20 chamber. A fuel pressure regulator 27 (such as a one-way valve) is placed between the feedback port 24 and the fuel storage vessel 11. The fuel pressure regulator 27 allows the fuel storage vessel 11 to be pressurized when there is a greater pressure in the reaction chamber 20 than in the fuel storage vessel 11. If the pressure in the reaction chamber 20 is lower than the pressure in the fuel storage vessel 11, the pressure in the fuel storage vessel 11 is maintained by the fuel pressure regulator 27 until such time as the pressure in the fuel storage vessel 11 falls below that of the reaction chamber 20. Waste gas is vented through output port 23, and waste products, being heavier than the gas, collect at the bottom of the reaction chamber and are expelled through output port 26.

Figure 3:
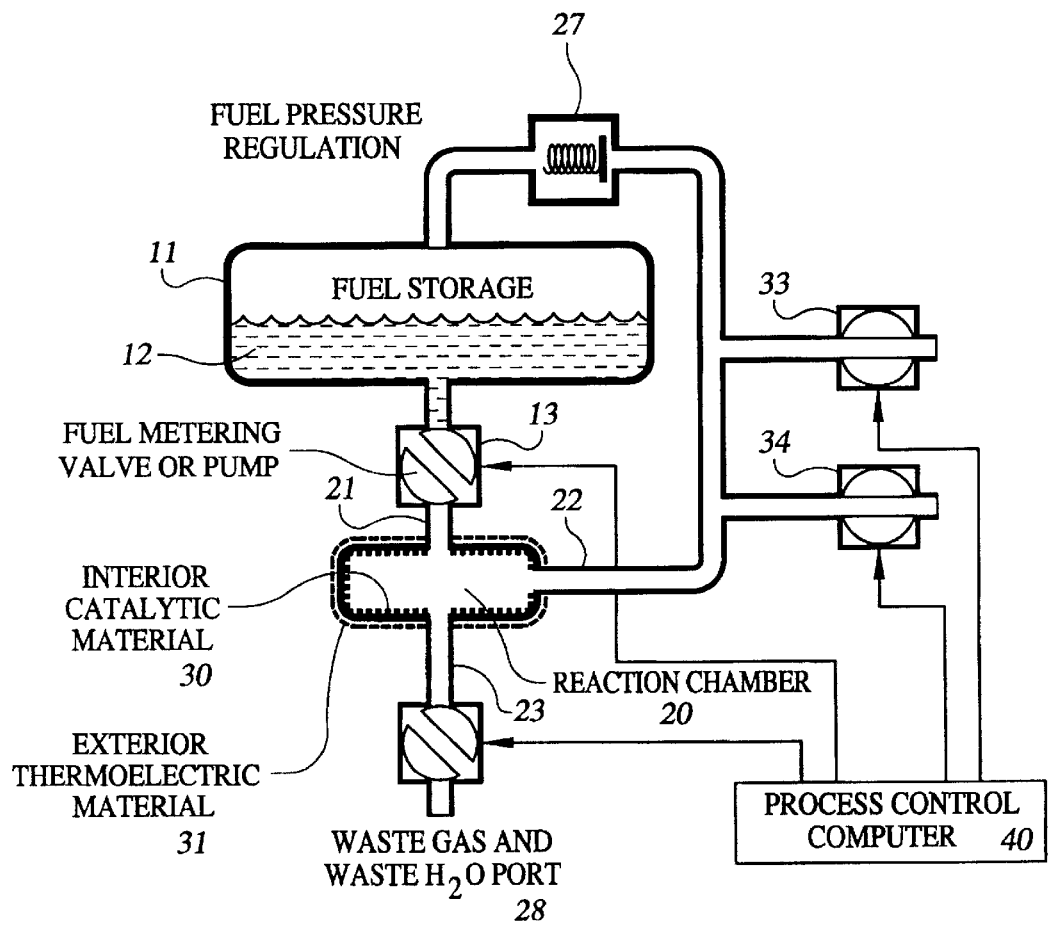
FIG. 3 is a schematic diagram of a third embodiment of the gas production portion of an RCM of the present invention.

FIG. 3 illustrates a third embodiment of an RCM 10 of the present invention. In this embodiment, a pressurized fuel storage vessel 11 containing a monopropellant 12 is connected through a metering device 13 into a reaction chamber 20 having an input port and two output ports 22 and 23. The metering device 13 also acts as a one-way valve to prevent reverse flow of the monopropellant back into the fuel storage vessel 11 due to increased gas pressure formed in the reaction chamber 20. The reaction chamber 20 contains a catalyst 30 that is reactive with the monopropellant 12. The exterior of the reaction chamber is maintained in thermal contact with a thermoelectric power generator 31.

The monopropellant fuel activating the RCM must be metered. Metered flow is a function of the orifice size of the metering device 13 and the input port 21, the pressure of the fuel storage vessel 11, and the efficiency of the catalytic reaction. In this embodiment, the metering device 13 is controlled by a processor 40. The flow through metering device 13 is regulated based on the pressurization of the fuel storage vessel 11. In lieu of a fuel pump, this embodiment uses the pressure of the reaction to force more monopropellant 12 into the reaction chamber 20 once the pressure in the reaction chamber 20 has dropped as mass is vented during each cycle of the RCM. A pressure regulator 27 (such as a pulsed valve or a "spring" regulator) is connected to output port 22 and maintains a positive pressure in the fuel storage vessel 11.

The power generated by the RCM is interfaced to the external devices being powered from the reaction chamber 20 through output port 22 via one or more valves 33 and 34. These valves may be mechanically actuated upon demand of other systems, or may be controlled by a processor 40 as shown in FIG. 3.

The waste products are periodically expelled through a valve 28 connected to output port 23 from the reaction chamber under pressure derived from the reaction chamber itself. Waste products, which are typically liquids, being heavier than the gas produced during the reaction, collect at the bottom of the reaction chamber and are expelled through port 23 and valve 28. In this embodiment, valve 28 is controlled by a processor 40.

As noted, the chemical reaction is exothermic. The RCM embodiment depicted in FIG. 3 uses the heat liberated by the chemical reaction to generate small amounts of electrical power. This is accomplished by maintaining thermal contact between the exterior of the reaction chamber 20 and a thermoelectric power generator 31. The thermoelectric power generator 31 can be any conventional thermoelectric device, such as a thermocouple , Peltier device, etc. More efficient thermoelectric power generators may be developed for specific use with the RCM.

In a preferred embodiment, the monopropellant 12 used in the RCM is hydrogen peroxide ($H_2O_2$), and in particular high concentration hydrogen peroxide, which is defined as a hydrogen peroxide solution of 70% or greater and is designated herein by the acronym HCHP. HCHP was selected for the preferred embodiment due to its ease of storage and handling, and lower cost. However, other monopropellants such as hydrazine ($H_2NNH_2$), which has a greater energy density than HCHP, may be used without departing from the spirit and scope of the invention.

In the preferred embodiment, the concentration and purity of the hydrogen peroxide ($H_2O_2$) fuel determines the heat of reaction which is critical to the formation of $H_2O$ in a gaseous phase rather than in a liquid phase. It is important to have $H_2O_2$ of sufficient purity to allow the heat of reaction to be beyond the boiling point of water so that the $H_2O$ formed by the reaction is gaseous steam rather than liquid water. Too low a concentration of $H_2O_2$ will produce too much liquid water which in turn dilutes the incoming $H_2O_2$ and quenches the reaction. This can be avoided by using $H_2O_2$ concentrations above 70%.

The hydrogen peroxide ($H_2O_2$) bought in pharmacies, is a stabilized 3% solution that has been used as a topical antiseptic for many years. When hydrogen peroxide is concentrated (above 52% by weight), it violently reacts with certain metals and oxides (catalysts), decomposing into gaseous oxygen and superheated steam. When HCHP of 70% and above comes in contact with certain metals like copper, iron, silver, and lead, it decomposes exothermically, giving off pure oxygen, water as steam, and heat. The decomposition follows the reaction:

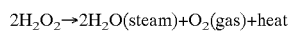

$$2H_2O_2 \rightarrow 2H_2O(steam) + O_2(gas) + heat$$

For example, the gas generated by one pound of 90% HCHP upon complete decomposition (at an ambient temperature of 70° F.), gives off 60.3 cubic feet of gas ($O_2$+steam) and the heat given in the reaction will reach 1,364° Fahrenheit in about 25 milliseconds. Of the gas generated 43% is $O_2$.

Hydrogen peroxide ($H_2O_2$) reacts with a wide range of catalysts, including various precious metals such as silver and platinum, as well as common metals such as iron and various metallic oxides. Preferred catalysts will be light weight and can be applied to the surface of other materials. The surface area of the catalyst and the aspiration of the monopropellant over the catalyst surface are important factors in determining how rapidly the catalytic decomposition of the monopropellant will occur. The better catalysts will contain micro pores as a means of increasing surface area.

All inorganic compounds and most metals and metal oxides will react with HCHP. Some are more reactive than others in such a way that a "reactivity" characterization can be generated to catalog elements and compounds according to their use. Material classification is typically derived empirically. Reactivity usually occurs with combustible materials, strong reducing agents, most common metals, organic materials, metallic salts, and alkalis. This uniform classification of materials has been reduced to the following classes that measure the suitability of various materials for use in constructing a RCM. The classes are defined by the ability of the materials in each class to decompose HCHP in percentage of liberated oxygen per unit of time (week or years):

Class-1: Materials that are completely compatible for extended contact with HCHP. These materials will not contaminate the HCHP. Typical uses are: tanks, reservoirs, long term storage. These materials include certain pure aluminum (99.5% or greater), aluminum alloys (1060, or 5254), stainless steel (AISI 316L, SIS 2353), HDPE plastics such as Teflon (TFE) and Viton, and pure glasses.

Class-2: Materials that are suitable for repeated short time contact with HCHP. These materials can be used repeatedly with HCHP, but no one period should exceed 4 hours at 160° F. or 1 hour at 70° F. These materials are preferred for valves in one-shot RCMs using HCHP as the monopropellant. These materials include aluminum alloys, silicone rubber, various HDPE plastics, and certain PVC materials.

Class-3: Materials that are suitable for repeated short time contact with HCHP prior to prompt use of the HCHP. These materials -continued can be used repeatedly with HCHP, but no one period should exceed 1 minute at 160° F. or 1 hour at 70° F. These materials are preferred for valves in one-shot RCMs using HCHP as the monopropellant. These materials include aluminum alloys, and certain PVC materials.

Class-4: Materials that are unsuitable for short or long term contact with HCHP. These materials will react with HCHP in different degrees up to, and including the formation of unstable explosive mixtures. Most of the Class-4 materials are also catalysts for HCHP. These materials include organic materials, ethanol, glycerol, hypochlorite, ammonia, acetone, iron, copper, silver, platinum and their compounds.

In preferred embodiments, compounds of silver or platinum are suitable for use as a catalyst so long as the surface area is maximized by depositing the catalyst onto a porous surface, or containing it in the form of a dust. However, any material that is capable of catalyzing decomposition of the chosen monopropellant may be used as the catalyst without departing from the spirit and scope of the invention. In the preferred embodiment, the catalytic material is not sacrificial and continues to function without degradation.

The temperature of the monopropellant is one of several variables that affect optimum performance and reactivity. To compensate for temperature changes, the chosen catalyst material should provide a consistent and predictable catalytic reaction throughout its range of temperatures. Also as ambient temperatures decrease, the catalyst will have a tendency to be "poisoned" by the stabilizers and organic compounds found in monopropellants (such as hydrogen peroxide with concentrations of less than 70 percent) as they coalesce. It is therefore important to use highly concentrated pure fuels that are totally consumed. HCHP in concentrations above 70% requires little stabilization, and concentrations in excess of 90% percent are the most stable forms of HCHP. In the preferred embodiment, 90% technical grade HCHP is the preferred fuel type because of its stability and shelf life and its improved energy density over lower concentrations diluted with water and stabilized with other chemicals.

Figure 4:
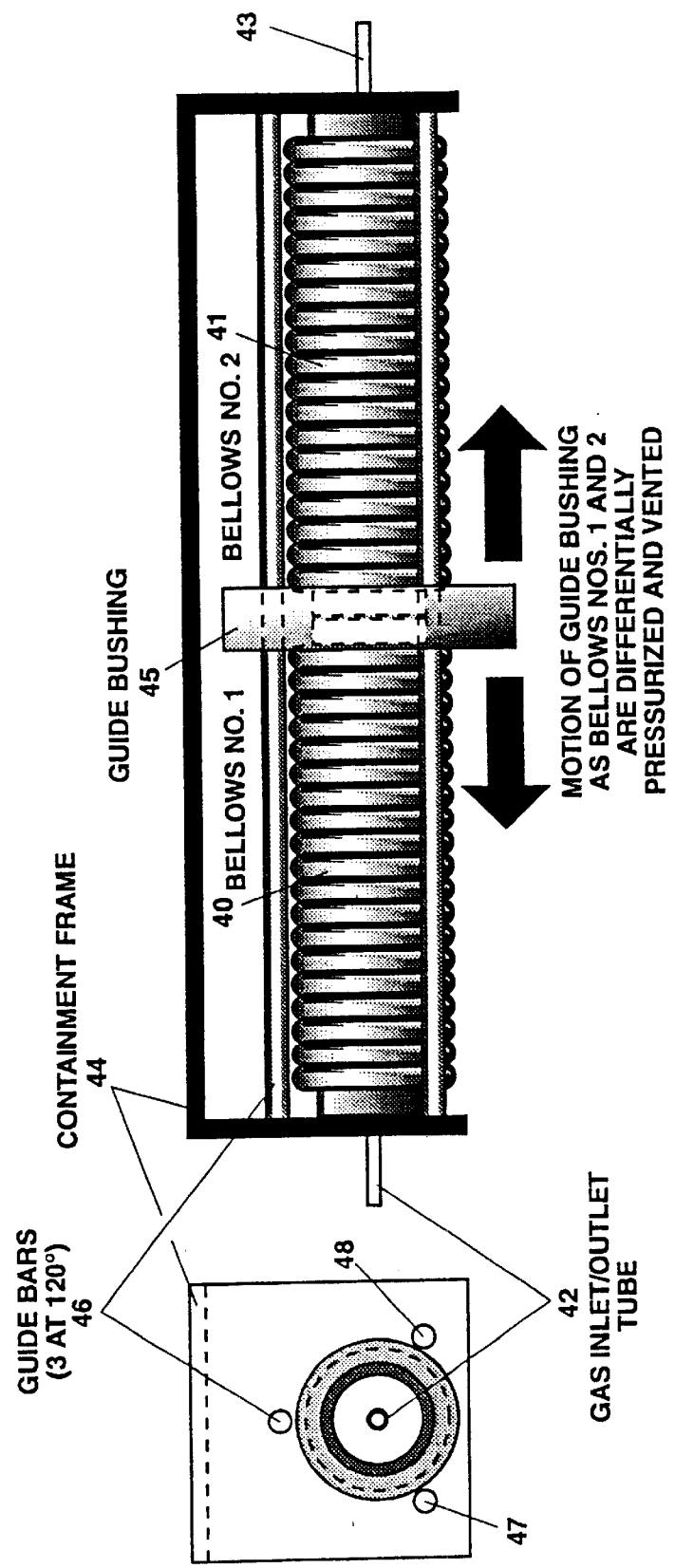
FIG. 4 is a schematic diagram illustrating a first embodiment of how the RCM uses the gas produced by the embodiments illustrated in FIGS. 1–3 to create a reciprocating motion.

The description above with respect to FIGS. 1, 2 and 3 details the gas production portion of the RCM. FIG. 4 shows a preferred embodiment of how this gas can be used to create a reciprocating motion. A pair of bellows 40 and 41 are placed in line. Each of the bellows 40 and 41 has an opening at one end to serve as a gas inlet and outlet tube. These inlet and outlet tubes are denoted by reference nos. 42 and 43. The bellows 40 and 41 are mechanically precompressed in a static containment frame 44 such that when the first bellows 40 is extended to its maximum length when pressurized through its gas inlet tube 42, it in turn further compresses the second bellows 41 without itself becoming overextended. When the second bellows 41 is compressed, the volume of bellows 41 is decreased, and the gas is allowed to escape through the gas outlet tube 43 for bellows 41. The amount of mechanical precompression is a function of the bellows design and material. A commercially manufactured bellows on the order of 0.75 inches in diameter and 2.0 inches long is typically made from stainless steel, nickel, or a bronze alloy. Over-extending a bellows will permanently damage it by changing the "memory" of the bellows so that it does not return to its resting length when unpressurized. Similarly, mechanically compressing a bellows beyond its designed limit can change its "memory". Therefore, the amount of precompression of bellows 40 and 41 must be such that for a designed operating pressure point, neither bellows will be extended or compressed beyond its normal limits of travel.

A guide bushing 45 is placed between the two bellows 40 and 41. As the bellows are alternately pressurized and vented (pressurizing the first bellows 40 while venting the second bellows 41, followed by pressurizing the second bellows 41 while venting the first bellows 40, and repeating), the guide bushing 45 moves back and forth along the axis of the bellows. To assure linear motion of the guide bushing 45, guide bars 46, 47 and 48 are attached to the containment frame 44 parallel to the axis of motion. The guide bushing 45 rides along these guide bars 46, 47 and 48. In one embodiment, aluminum guide bars are used along with a Teflon (TFE) guide bushing so the bushing is self lubricating. The guide bars 46, 47 and 48 also serve to contain any "squirming" of the bellows as they extend, since bellows typically tend to bend when they are pushing against a load.

The guide bushing 45 can be made to move back and forth by alternately pressurizing and venting the bellows 40 and 41. Attachments to the guide bushing (not shown) can therefore be used to transmit force from the guide bushing 45 to do work in other mechanisms external to the RCM (not shown).

The amount of force available for useful work is a function of the bellows end surface area, the pressure of operation, spring forces involved in extending and compressing the bellows, and friction. The speed of reciprocation is a function of the inertia of the components used to implement the RCM as well as the latency involved in switching the gas pressurization and venting between the bellows. In laboratory experiments, an RCM of approximately 3 inches in length and 0.75 inches in diameter produced up to several pounds of force with ranges of reciprocating motion over several tenths of an inch at reciprocation frequencies of up to 20 Hz. The envelope defining these ranges of operation is shown in FIGS. 5A and 5B, and is predominantly a function of operating pressure and frequency of reciprocation. For a given pressure of operation and RCM structural mass, the amount of linear travel by the guide bushing will decrease with increasing frequency due to both inertia and limitations in the transfer of gaseous mass into and out of the inlet/outlet tube orifices. In spite of the decreased linear travel of the guide bushing at higher reciprocating frequencies, the force available to do work remains high, and this allows mechanical attachments of poor mechanical advantage to still transmit useful power to other mechanisms such as flapping wings, legs, or locomotive-type wheels.

Figure 6A:
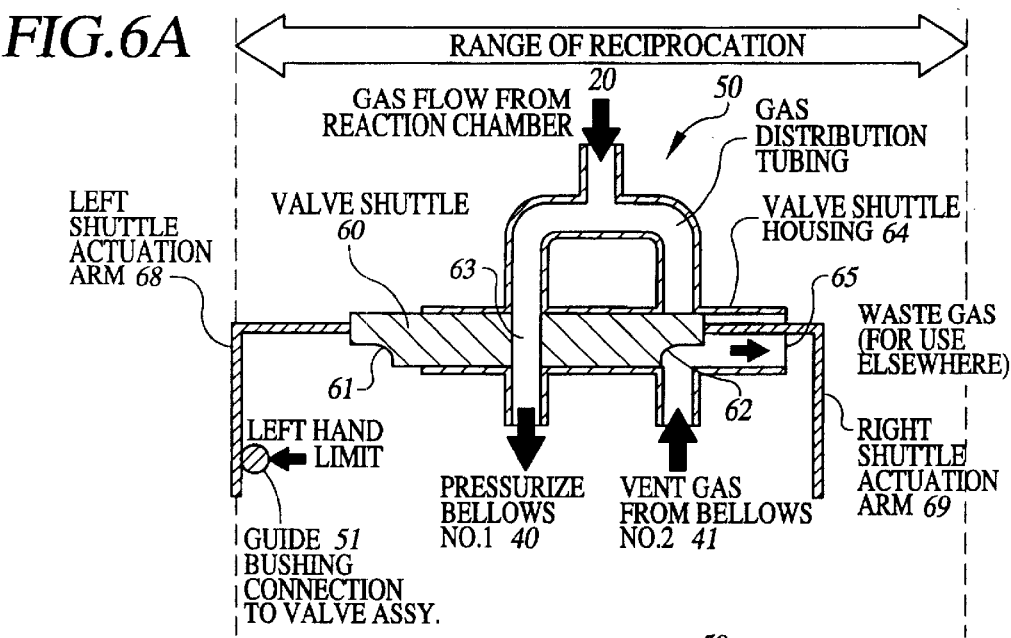
FIGS. 6A–6C are schematic diagrams illustrating a first embodiment of a self-actuating valve for driving the embodiment illustrated in FIG. 4.
Figure 6B:
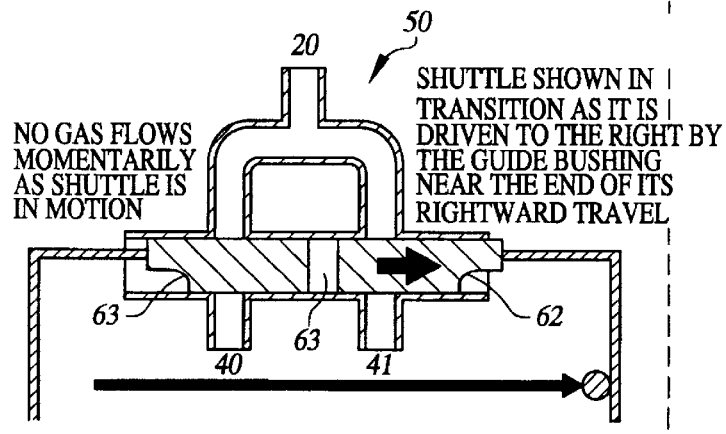
Figure 6C:
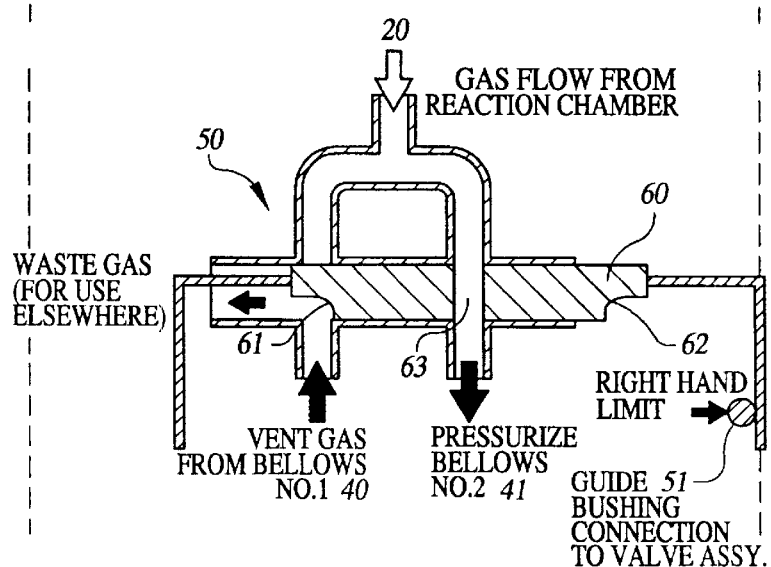

The bellows 40 and 41 of FIG. 4 can be driven by a self-actuating valve which cycles pressure between the first bellows 40 and the second bellows 41, alternately venting the previously pressurized bellows. FIGS. 6A–6C illustrate a preferred embodiment of a self-actuating valve 50 which is driven directly by the motion of the guide bushing 45 of FIG. 4. As shown in FIG. 6A, initially a valve shuttle 60 having sculptured ends 61 and 62 and a central hole 63 is oriented such that gas is able to flow from point 20 (which corresponds to the reaction chamber of the RCM) through the valve shuttle 60 to point 40 (which corresponds to the first bellows 40 of FIG. 4). At the same time, gas from point 41 (which corresponds to the second bellows 41 of FIG. 4) is allowed to vent from the end of the valve 65 to be used elsewhere or simply discarded depending on the application. The valve shuttle 60 can be rectangular or round in cross section. If implemented as a round piece, it must be constrained so as not to rotate about its longitudinal axis. The valve shuttle 60 is housed in a valve shuttle housing 64, which is a tube of matching inner proportions that are tight enough to prevent gas leakage, but loose enough to allow shuttle movement. To be self lubricating, the valve shuttle 60 is made of a material such as Teflon (TFE) or brass. The valve shuttle housing 64 is made of a material such as steel, aluminum, or plastic which can withstand the gas temperatures of the reaction chamber while maintaining a polished inner surface. Alternatively, for instance, both the shuttle and housing may be diamond coated to take advantage of like coefficients of thermal expansion.

An actuation arm is connected to each end of the valve shuttle 60. These arms 68 and 69 are spaced such that they will interact with an appendage 51 from the guide bushing at the end of the guide bushing travel. Except at the ends of travel, this appendage 51 is free to move without contacting either of the shuttle actuation arms 68 and 69. The appendage 51 makes connection with one of the shuttle actuation arms at a point occurring just before the maximum extension of a bellows.

In FIG. 6A, the first bellows 40 is being pressurized while the second bellows 41 is allowed to vent. As the first bellows 40 extends under pressure, the guide bushing appendage 51 moves to the right between the shuttle actuation arms 68 and 69. Eventually the guide bushing appendage 51 contacts the right hand shuttle actuation arm 69 and pushes the arm 69 (along with the attached valve shuttle 60) to the right. As illustrated in FIG. 6B, this momentarily shuts off gas flow into or out of either of the bellows but inertia causes the valve shuttle 60 to continue beyond this null point to the limit of right hand travel. At this position, illustrated in FIG. 6C, the first bellows 40 is allowed to vent while pressure from the reaction chamber 20 is applied to the second bellows 41. This in turn causes the guide bushing to reverse direction, which moves the guide bushing appendage 51 back to the left, where it ultimately contacts the left shuttle actuation arm 68 and returns to the position illustrated in FIG. 6A, which repressurizes the first bellows 40 while venting the second bellows 41. This process continues as long as there is gas pressure from the RCM's reaction chamber. The speed at which this regenerative action occurs is predominately a function of mass flow (driven by reaction chamber pressure) into and out of the bellows.

Figure 7A:
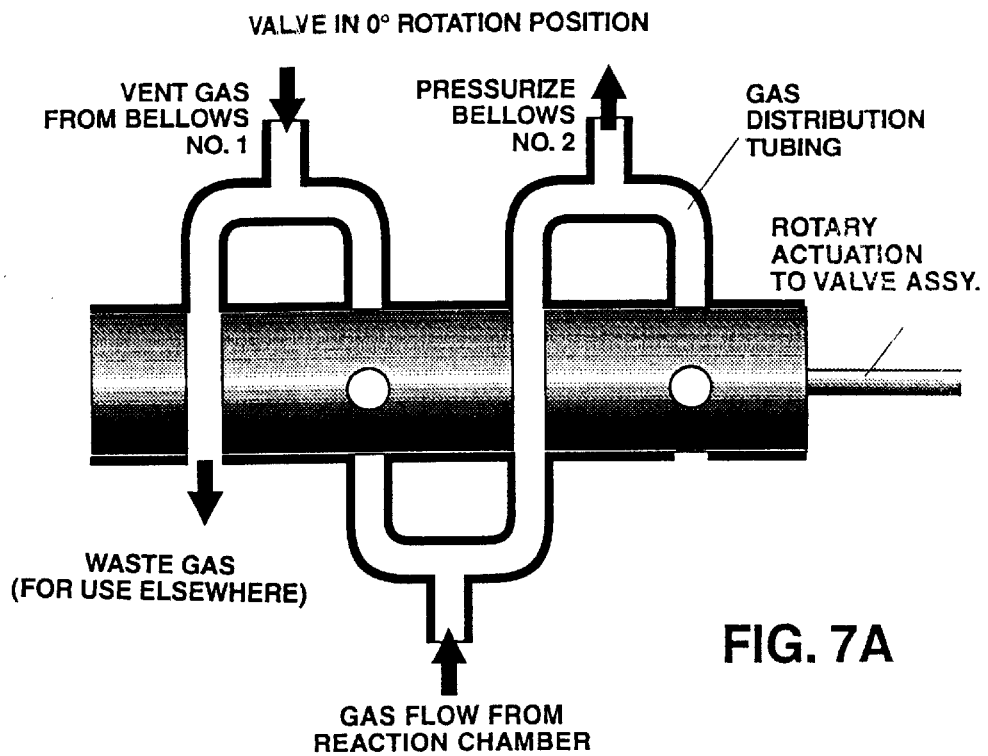
FIGS. 7A–7B are schematic diagrams illustrating a second embodiment of a self-actuating valve for driving the embodiment illustrated in FIG. 4.
Figure 7B:
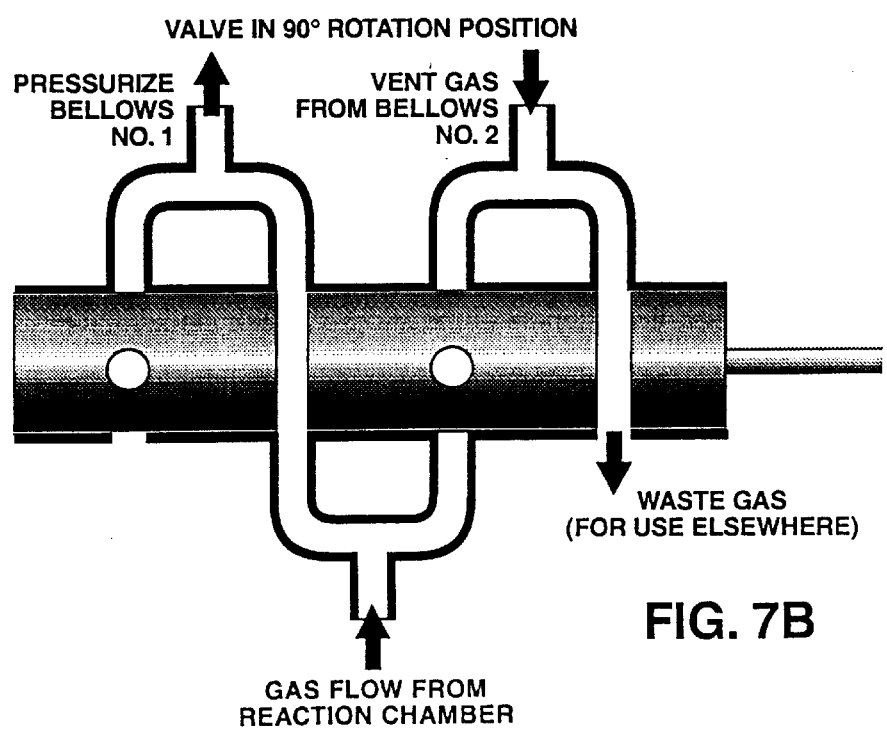

An alternative valve mechanism shown in FIGS. 7A–7B relies on rotation of an internal structure rather than the reciprocating motion of the shuttle in FIGS. 6A–6C to alternately pressurize and vent the two bellows. The rotating motion can be derived from the reciprocating motion of the RCM guide bushing or can be derived from a mechanism that the RCM is propelling. The embodiment in FIGS. 7A–7B is more compact than that of FIGS. 6A–6C, but more complex in its implementation. Both the implementations of FIGS. 6A–6C and FIGS. 7A–7B require low friction internal structures that rely on a small amount of inertia to overcome a small null zone.

Referring now to FIGS. 8A through 8C, an actuator 80 of an RCM for converting heat and gas into reciprocating motion will be described. As depicted in FIGS. 8A through 8C, the actuator 80 preferably is integrally formed with the body 82 of the RCM; however, various other configurations, such as configurations utilizing independent actuator modules which are adapted for engaging the RCM body, may be utilized. In the embodiment depicted in FIGS. 8A through 8C, actuator 80 generally includes an RCM piston 84 which cooperates with a valve spool 86 (as described in detail hereinafter) to convert gas and heat created in a combustion chamber into reciprocating motion of the piston.

In order to produce a reciprocating motion, a volume of pressurized gas is delivered to a first expansion chamber 88, which is defined, at least in part, between piston head seals 90 and piston shaft seals 92. Preferably, the gas is provided to the first chamber via an intake port 93 and an intake duct(s) 94 that communicate with the valve spool to permit a flow of gas to enter the intake port, flow through the various ducts and about a first flow channel 96 of the valve spool. Thus, as depicted in FIG. 8A, when the valve spool is in its first position, gas may enter the intake port and be provided to the first chamber. Orienting the valve spool in its first position also aligns a second flow channel 98 with an exhaust duct 102. So configured, a second chamber 104 may communicate with an exhaust port 108 such that, when the valve spool is in its first position, gas residing in the second chamber may be vented therefrom, through the various exhaust ducts, and out through the exhaust port.

As depicted in FIG. 8B, as gas is permitted to enter the first chamber and the gas residing in the second chamber is provided to the exhaust port, the piston is driven from its first position (depicted in FIG. 8A) toward its second position (depicted in FIG. 8C). At a position intermediate its first and second positions, a first valve strike cam 110, which travels with the piston, is configured to engage a portion of the valve spool, thereby urging the valve spool to its second position, i.e., the valve spool is carried by the valve strike cam of the piston. Thereafter, as depicted in FIG. 8C, once the valve spool is appropriately seated in its second position, the first and second channels of the valve spool are realigned relative to the various intake and exhaust ducts, thereby directing intake gases to the second chamber and allowing gas residing in the first chamber to be vented to exhaust. So provided, the cycle depicted in FIGS. 8A and 8B may be reversed, whereby the piston is driven back to its first position, which causes the valve spool to be carried to its first position, resulting in a reciprocating motion of the piston.

The piston and valve spool of the actuator may be formed of various materials, as well as being formed in various configurations; however, for a typical application, forming the piston and/or the valve spool of a metal of suitable strength, such as stainless steel, may be considered appropriate. In regard to the various seals, such as the piston head seal and various other piston and valve spool seals, various materials may be utilized as well, with material such as PTFE being considered suitable for the embodiment depicted.

Figure 9:
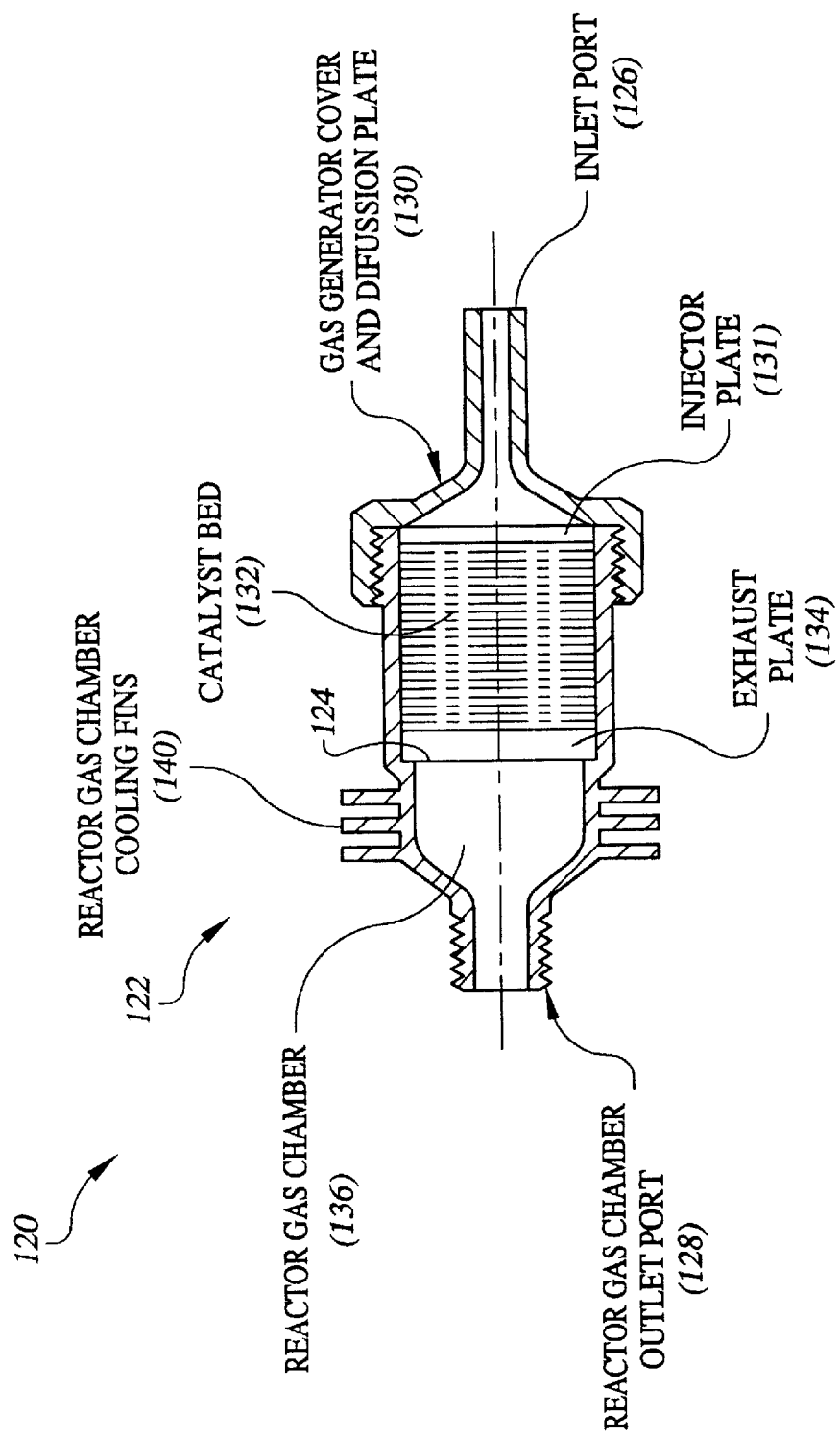
FIG. 9 is a schematic diagram of a gas reactor which may be utilized in a preferred embodiment of the present invention.

Referring now to FIG. 9, a preferred embodiment of a gas reactor 120, which may be utilized with the actuator 80 (FIGS. 8A through 8C), will be described. As depicted in FIG. 9, gas reactor 120 includes a body 122 which defines an interior chamber 124. Interior chamber 124 communicates with an external environment via an inlet port 126 and an outlet port 128. Preferably, outlet port 128 is adapted to engage the inlet port of an actuator, such as actuator 80 (FIGS. 8A–8C). Inlet port 126 is adapted to receive a metered flow of fuel, such as $H_2O_2$, for example. Upon entering the interior chamber, the metered flow of fuel is presented to a diffusion plate 130, which diffuses the fuel, and an injector plate 131 so that the fuel may be provided to a catalyst bed 132, thereby permitting reaction between the fuel and catalyst of the bed to occur as described hereinbefore. Resultant heat and gas provided by the aforementioned reaction are then provided through exhaust plate 134 to gas chamber 136 and, ultimately, through the outlet port. Optionally, cooling fins 140 may be provided, such as about an exterior periphery of the gas chamber, so that the body may be suitably cooled, as necessary, so as not to inappropriately heat adjacent components or to increase the heated surface area of the device so as to accommodate the placement of conformal thermoelectric devices, for example, which are dependent upon $\Delta T$ for operation.

The teachings of the present invention may be implemented in a self-propelled vehicle. For example, and not for the purpose of limitation, such a vehicle may be capable of flight, e.g., a micro air vehicle (MAV), water-borne motion, such as while submerged and/or on the surface of the water, and/or land-borne motion. For ease of description, reference is now made to FIG. 10, which depicts a schematic diagram of a representative vehicle 150, and which will be described in detail as an MAV embodiment.

Figure 10:
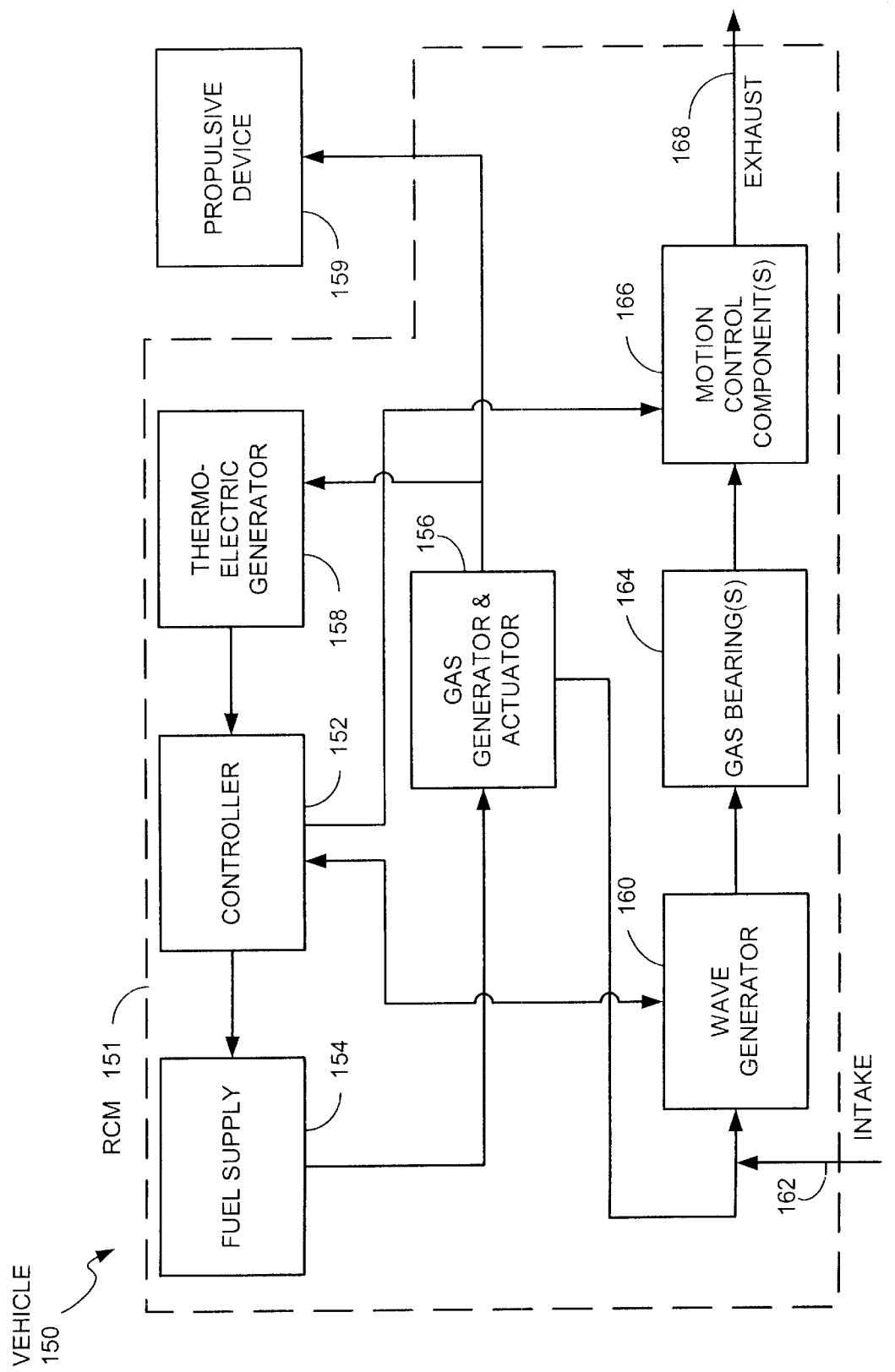
FIG. 10 is a schematic diagram illustrating components of a preferred embodiment of the present invention.

As shown in FIG. 10, MAV 150 includes an RCM 151 which cooperates with a propulsive device (or propulsor), such as wings, fins, legs, etc., with the propulsive device(s) being selected based upon the desired characteristics of the vehicle. Based upon selection of one or more propulsive devices, these operation and/or manipulation of these devices may be utilized to influence motion characteristics of the vehicle. For example, motion characteristics may include direction of motion, velocity, acceleration, pitch, roll, yaw, altitude, depth, etc. In this regard, RCM 151 incorporates a controller 152 that is adapted to implement various functionality of the MAV. More specifically, the controller 152 may be embodied as a computer or processor-based device that may be implemented in hardware, software, firmware, and/or combinations thereof. So provided, the controller may be adapted to execute instructions for performing various functions, such as described hereinafter.

As the MAV is capable of sustained and independent flight, a supply of fuel 154 is provided that is configured to be delivered, as needed, to a gas generator and actuator 156 of the RCM. So configured, heat and gas produced by the gas generator may be provided to various other components of the MAV for facilitating various functionality. In particular, heat and/or gas generated within the gas generator may be provided, via the actuator, to one or more propulsive devices 159, such as wings, for example. So configured, the reciprocating motion provided from the actuator to the wings may generate an appreciable portion of the lift required for propelling the MAV in flight.

Additionally, as depicted in the embodiment of FIG. 10, MAV 150 may incorporate a thermoelectric generator 158 which is configured to convert heat provided by the gas generator into electrical power that may be utilized by various components of the MAV. More specifically, the thermoelectric generator 158 may provide electricity to the controller 152, among others.

A wave generator 160 also may be provided which is adapted to receive heat and/or gas from the gas generator and, preferably, external air, such as via an intake 162. Wave generator 160 may be configured to generate various wave forms, such as acoustic energy waves (described in detail hereinafter). Gas from the gas generator also may be provided to one or more gas bearings 164 which are adapted to provide reduced friction of various engaging surfaces of components of the MAV so that the heat and/or gas produced by the RCM may be more efficiently converted into reciprocating motion, for example. A typical gas bearing includes first and second engaging surfaces which are configured to engage each other. At least one of the engaging surfaces is provided with a surface, such as a surface incorporating a perforated structure, that is adapted to direct a flow(s) of air toward the other of the engaging surfaces, thereby forming an gas cushion or bearing therebetween.

Gas produced by the gas generator also may be provided to various motion control components 166 (as described in detail hereinafter). Thereafter, any unused heat and/or gas may be provided to exhaust 168 for producing additional thrust for the MAV.

Figure 11:
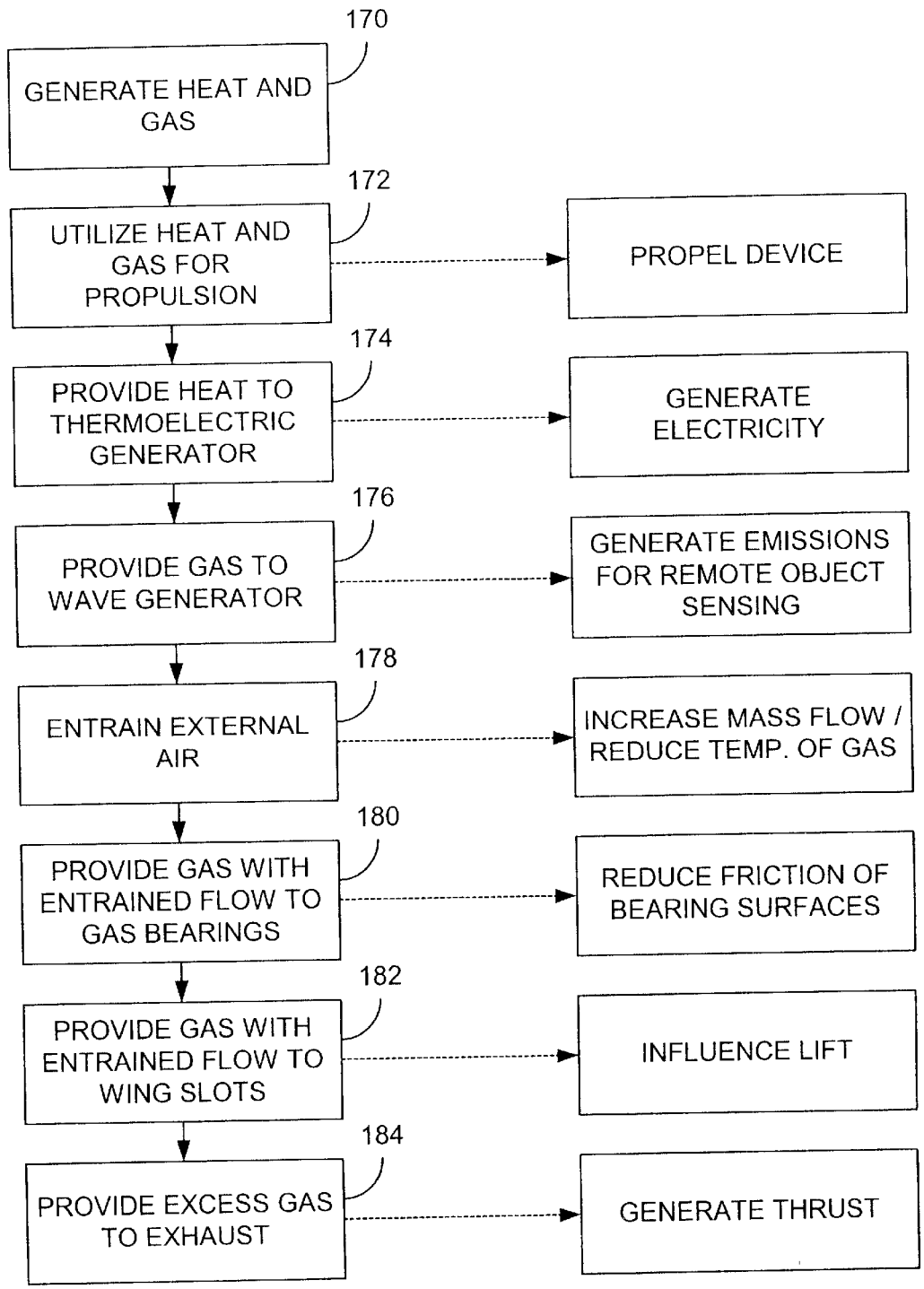
FIG. 11 is a block diagram depicting functionality implemented in preferred embodiments of the present invention.

Functionality of the embodiment schematically depicted in FIG. 10 will now be described with reference to the block diagram of FIG. 11. As shown therein, preferred functionality (or methods) that may be implemented by the present invention may be construed as beginning at block 170 where heat and gas are generated, such as in a gas reactor of an RCM. The heat and gas so generated may be utilized for propulsion (block 172), i.e., the heat and gas may be converted to a form suitable for propelling the device. Thereafter, as depicted in block 174, heat may be provided to a thermoelectric generator, i.e., the heat may be utilized to generate electricity for powering various systems of the device. The gas also may be provided to a wave generator, as depicted in block 176, i.e., the gas may be utilized to generate emissions for performing object-sensing functions, as described in detail hereinafter.

As depicted in block 178, gas also may be utilized to entrain external air, such as by utilizing an ejector nozzle, so as to increase the mass flow of the gas and/or to reduce the temperature of the gas so that the gas may be suitable for various other uses. As depicted in block 180, one of these various uses may include providing the gas with the entrained flow to gas bearings, i.e., reducing friction of bearing surfaces by providing a flow of air between cooperating surfaces of the gas bearings. Similarly, as depicted in block 182, the gas with the entrained flow may be provided to wing slots, i.e., the gas with the entrained flow may be utilized for influencing the lift of various lift producing components of the device, thereby affecting control of the device particularly when in flight. Additionally, such as depicted in block 184, any remaining gas may be provided to exhaust, e.g., excess gas may be utilized to generate thrust for the device.

Figures 12A, 12B, 12C:
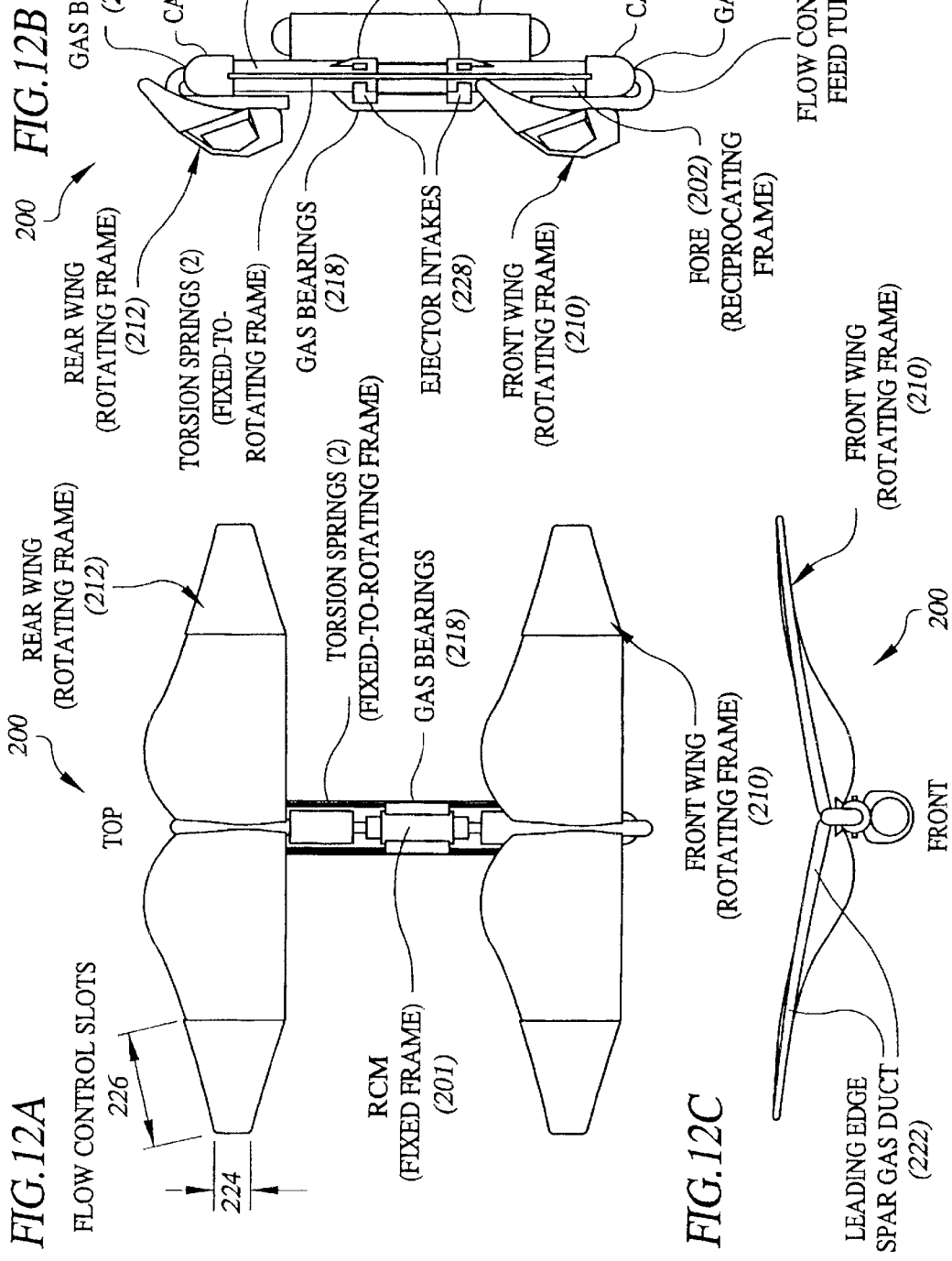
FIGS. 12A through 12C are top, side and front perspective views, respectively, of a preferred implementation of the present invention.

Reference will now be made to FIGS. 12A through 12C which depict top, side and front views, respectively, of a preferred embodiment of a micro air vehicle (MAV) 200, that may utilize the reciprocating chemical muscle of the present invention. As depicted in the aforementioned figures, vehicle 200 incorporates a reciprocating chemical muscle (RCM) 201 which may serve as a mounting platform for various other components of the vehicle. More specifically, fore and aft reciprocating frame members 202 and 204 preferably engage the RCM and cooperate with respective cam followers 206 and 208 so as to impart rotationally reciprocating motion to both front and rear wings 210 and 212, respectively. Various gas bearings, such as bearings 214, 216 and 218, may be provided for facilitating efficient conversion of heat and gas generated by the RCM into the aforementioned reciprocating motion.

As mentioned briefly hereinbefore, preferred embodiments also may facilitate generation of emissions for remote object sensing. In this regard, the vehicle 200 incorporates ultrasonic ranging devices 220 (described in detail hereinafter) which facilitate transmission and reception of ultrasonic waves for object sensing. Additionally, as described in greater detail hereinafter, various surfaces of the vehicle may be provided with flight control devices, such as gas ducts and slots for facilitating flight control of the vehicle. More specifically, the embodiment depicted in FIGS. 12A through 12C incorporates leading edge spar gas ducts 222 and appropriately positioned flow control slots 224 and 226 for influencing lift characteristics of the wings. Ejector intakes 228 also may be providing for drawing external gases (atmospheric gases) for mixing with the heat and gas internal to the MAV 200.

Figure 13:
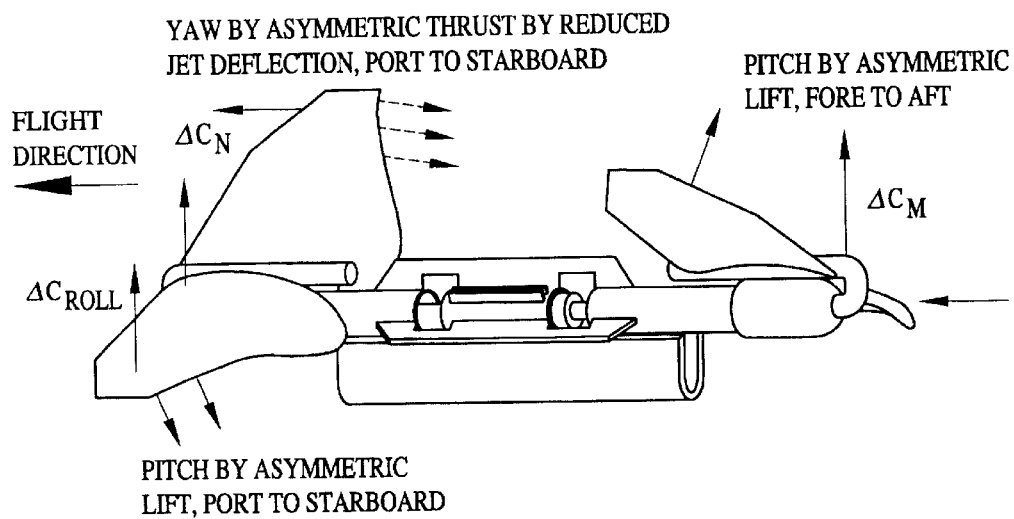
FIG. 13 is a schematic diagram illustrating representative flight control components and characteristics of a preferred implementation of the present invention.
Figure 14:
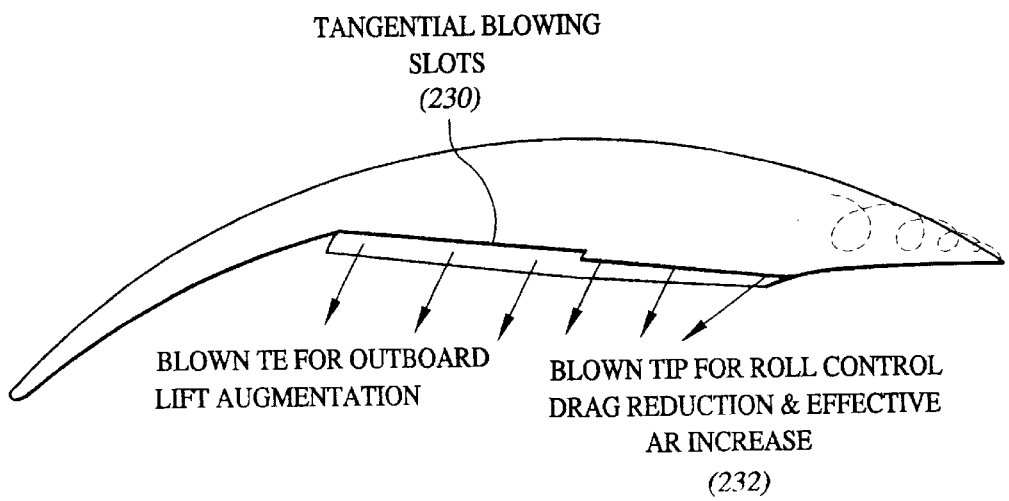
FIG. 14 is a schematic diagram depicting representative control surfaces utilized in the embodiment of FIG. 13.

As depicted in FIG. 13, roll and pitch of a vehicle may be affected by providing a flow of gas to one or more of the various control duct(s) and/or slot(s), thereby creating asymmetric lift and/or thrust for altering a flight path of the MAV. As shown in greater detail in FIG. 14, one or more of the lift-generating bodies 159, e.g., wings, may be provided with tangential blowing slots 230 and tip blowing slots 232, among others, for directing one or more flows of gas about the surfaces of the wings.

Figure 15:
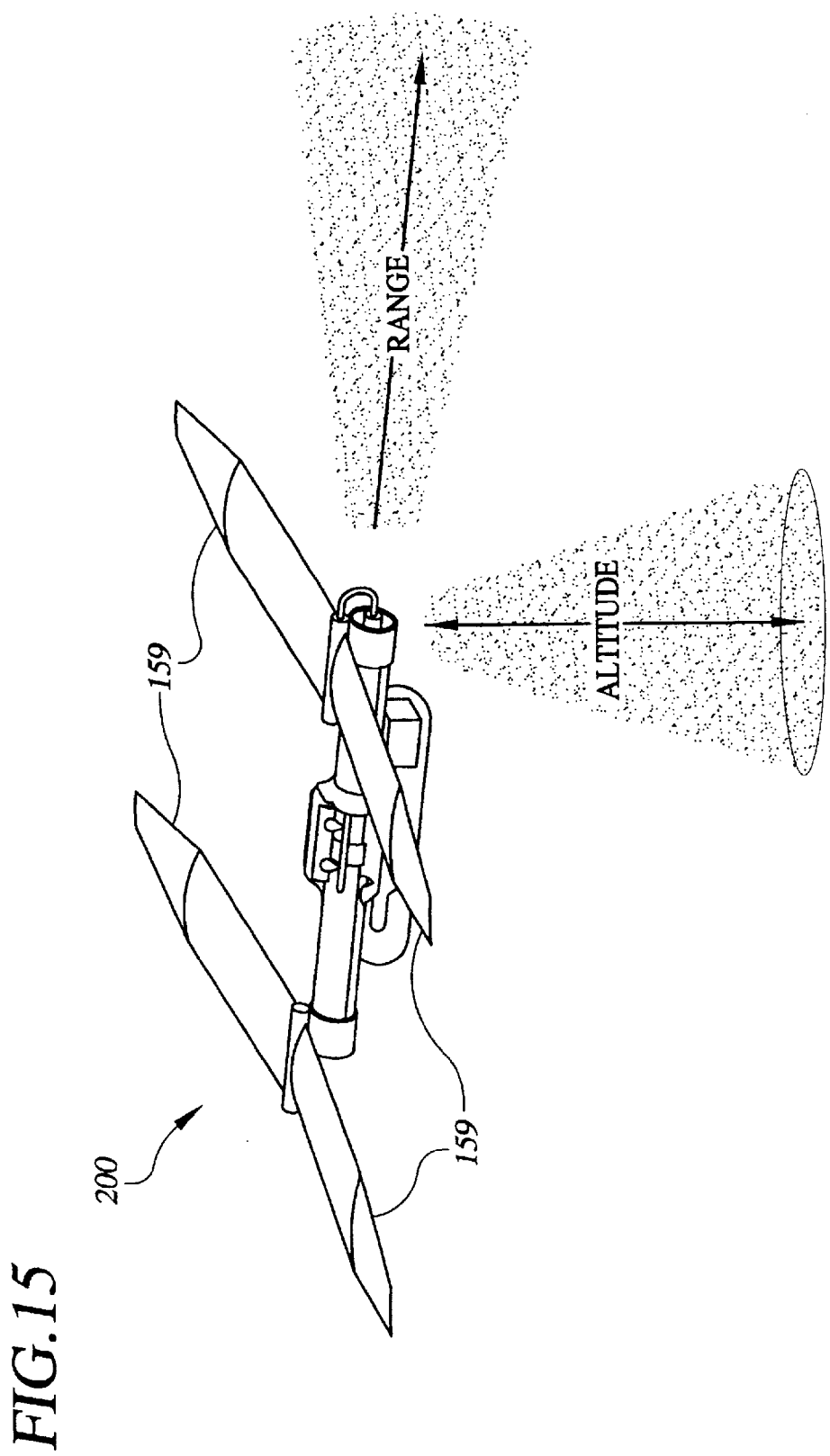
FIG. 15 is a schematic diagram illustrating preferred functionality of an object detection system which may be implemented by the present invention.
Figure 18:
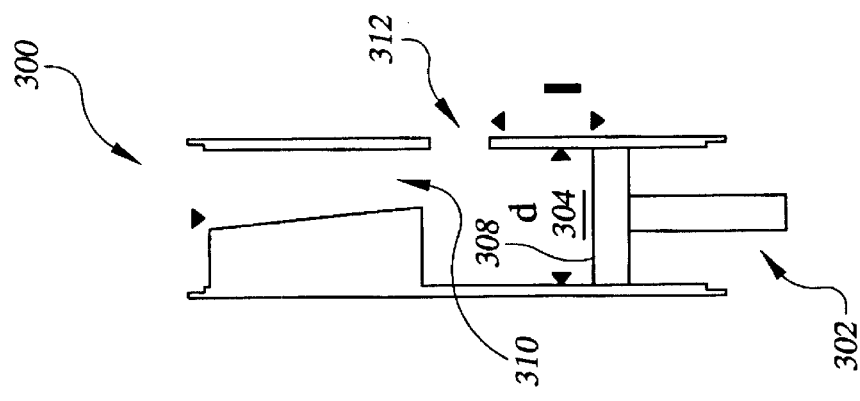
FIG. 18 is a schematic diagram illustrating preferred functionality of an acoustic ranging device.
Figure 16:
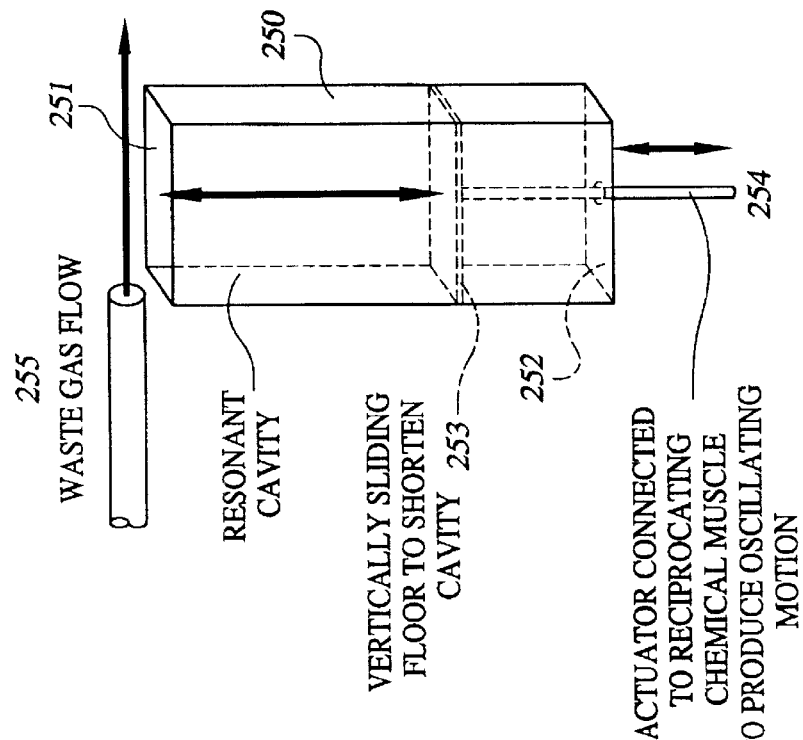
FIG. 16 is a schematic diagram illustrating a first embodiment of an RCM structure for using waste gas to produce acoustic energy.
Figure 17:
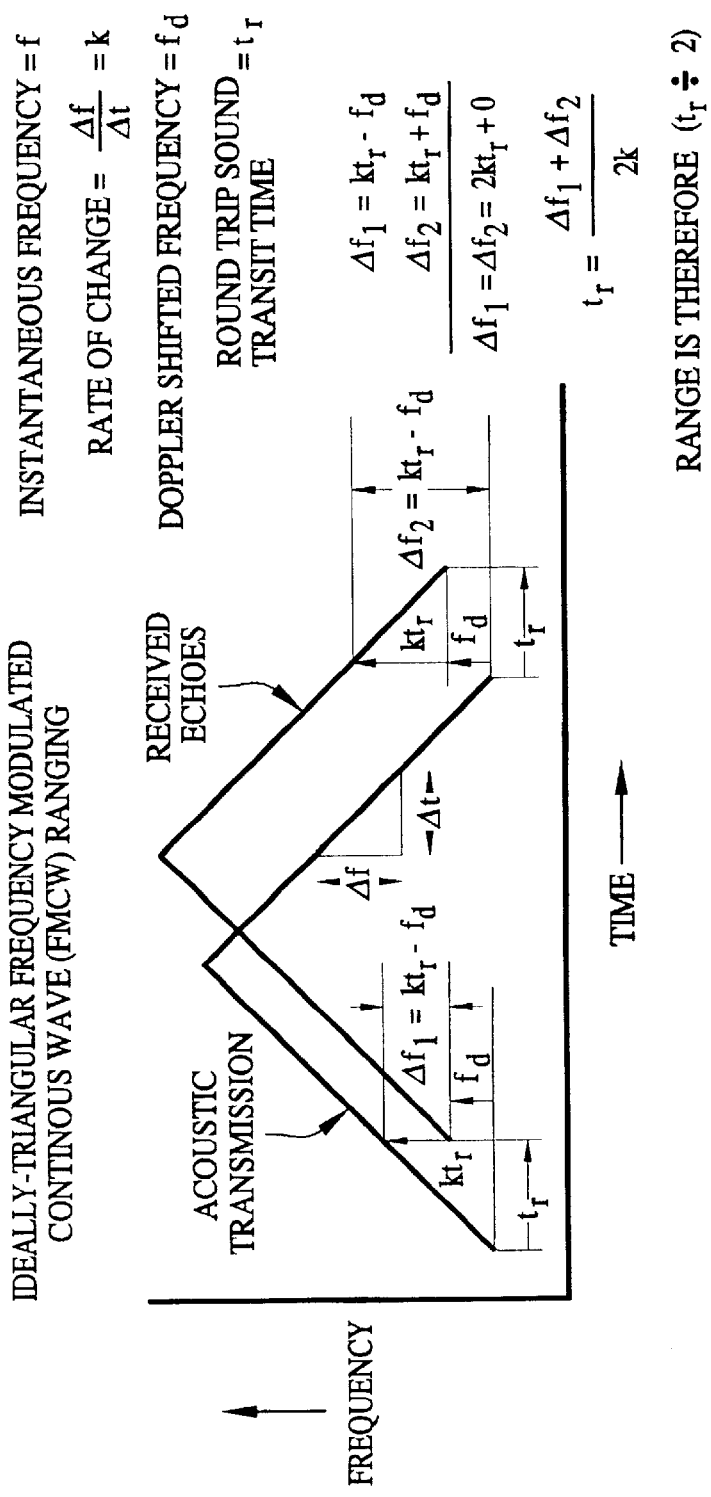
FIG. 17 is a graphic diagram illustrating how the acoustic energy produced by the structure of FIG. 16 may be used for frequency modulated continuous wave (FMCW) ranging.

As mentioned hereinbefore, and as depicted schematically in FIG. 15, preferred implementations of a vehicle utilizing an RCM may facilitate remote object sensing, such as facilitating altitude and range detection. In this regard, FIGS. 16–18 illustrate the optional feature of a vehicle that uses waste gas and piston motion to create an acoustic ranging device that is integral to the RCM. Such an acoustic ranging device can be used on vehicles propelled by the RCM to sense altitude in flying machines, depth in swimming vehicles, as well as environmental obstacles in front of and around the RCM-powered vehicle.

In FIG. 16, waste gas from the RCM is directed perpendicularly to the open end 251 of a round or rectangular tube 250. The other end of the tube 252 is closed, making the interior of the tube 250 a hollow cavity. A sliding base 253 is mounted in the cavity. The base 253 may be moved between the open end 251 and the closed end 252 along the central axis 254 of the cavity, thereby changing the length of the cavity. Gas passing over the open end of the tube sets up standing acoustic waves, which may be of virtually any frequency depending upon the particular application, that add resonantly to produce one or more tones depending on the modes that are excited. Cavities with flat sides can produce higher energy resonances at certain frequencies due to the interaction of the side wall resonances and the primary cavity (depth) resonance. In either case, the frequency modulated continuous wave (FMCW) waveform generated will actually consist of discrete frequencies based on a set of eigenvalues determined by the geometry of the resonant cavity for a given slide position. If the sliding base of the tube is connected to the RCM guide bushing, then the frequency produced by allowing waste gas to blow over the opening of the tube will approximate the motion of the RCM in that it will produce acoustic frequencies that cyclically rise and fall in frequency. If the tube is sized appropriately for the waste gas stream, ultrasonic frequencies will result. This is desirable in order to focus a narrow beam of acoustic energy in a particular direction.

Given that an acoustic beam can be directed at an obstacle, the range to the obstacle can be measured by taking advantage of the fact that the frequency of this beam is modulated cyclically at the rate of RCM motion or a multiple thereof. The cyclical motion can be sinusoidal, stepped, triangular, sawtooth, or otherwise configured, and the following explanation remains valid in principal. FIG. 17 depicts a triangular wave form, implying that the RCM is producing linear motion in both directions, and is saturating in that it abruptly reaches a physical limit at either end. In practice, it will be better to operate the RCM with a sinusoidal pattern, but for the purpose of this explanation, a triangular waveform provides a more straight forward explanation of the principal.

As the RCM oscillates back and forth, it is linked to the sliding base of the resonant acoustic cavity (shown in FIG. 16 to be rectangular). As waste gas is allowed to flow over the top of the tube, a resonance is set up which produces an acoustic emission that is proportional in frequency to the depth of the cavity at any given moment. This acoustic emission of varying frequency will propagate away from the RCM and any focusing element incorporated in the RCM (not shown) until it encounters an obstacle. Were this emission to be focused downward so as to be used as an altimeter, the emission would encounter the ground and would bounce back. Some portion of the energy that is not absorbed by the air and ground, or that is not lost due to $1/(range)^2$ spreading, will return to the RCM-propelled vehicle (not shown) where an electronic microphone can be used to register the presence of such energy.

The return echo will have the same frequency modulation shape as that which was transmitted, but it will be shifted in time (delayed) by an amount proportional to the total distance that the acoustic emission had to travel. The range to the floor could then be calculated by dividing the round trip delay from transmission to reception by two, and multiplying this time by the speed of propagation of the sound waves. One problem occurs when this calculation is being made for a moving platform, such as a flying vehicle propelled by the RCM. A Doppler frequency shift is impressed upon the signal by virtue of the fact that there is relative motion between the vehicle and the reflecting obstacle. For approaching obstacles, this frequency shift will increase all returned frequencies. For retreating obstacles, all frequencies will be decreased. FIG. 17 shows the approaching case in which the received echo frequencies are shifted upward as well as delayed. The Doppler shift can be resolved by measuring the difference in the received and transmitted frequencies on an instantaneous basis, and dividing by an amount proportional to the rate of change of the frequency modulation induced by the changing cavity length in response to the RCM motion.

Of unique value, is the fact that waste products (in the form of vented gas) from the RCM can be used with little added energy penalty to perform sensing for obstacle avoidance and altimetry. The modulation of the frequency for the FMCW emission is an artifact of the motion of the RCM. A single acoustic source such as that described above could also be multiplexed to emit in different directions by alternately focusing the acoustic energy in those different directions by means of a flat plate acoustic mirror (not shown) or parabolic dish (not shown) that is mechanically linked to the RCM.

Referring now to FIG. 18, an alternative embodiment 300 of the acoustic ranging device includes a piston or sliding base 302 which is provided within a resonant cavity 304. A flow of gas is directed toward a face 308 of the piston by a nozzle 310 which communicates with the cavity. As the piston is movable within the resonant cavity, so as to adjustably establish the interior dimensions and, correspondingly, the volume of the resonant cavity, wave forms possessing various characteristics may be produced within the cavity by the flow of gas. The wave forms are outwardly directable from the cavity via a propagation orifice 312. So configured, generation of wave forms of various frequencies may be provided by changing the depth of the cavity via the piston or, alternatively, by oscillating the pressure of gas directed into the cavity while maintaining the position of the piston at a predetermined depth. Once so generated, the wave forms may be directed, as desired, and utilized for functions such as ranging. In particular, the wave forms may be utilized for generating obstacle avoidance data and/or altitude data which may be utilized as inputs for vehicle control, e.g., as inputs for controller, 152 of FIG. 10.

For instance, the MAV may be configured to provide transmission information, corresponding to ultrasonic signals transmitted from the wave generator, and reception information, corresponding to reflected ultrasonic signals received by the MAV, to the controller. Preferably, the controller is configured to correlate the transmission information with the reception information and generate one or more control signal in response thereto. The control signal(s) may then be provided to appropriate components for altering flight characteristics of the MAV. For example, and not for the purpose of limitation, a representative control signal may be provided to a valve which, when opened, may provide a flow of gas to a portion of a wing for increasing the lift generated by that wing. So provided, resultant asymmetric lift created by the flow of gas may cause the MAV to change its direction of flight.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A system for producing power through a noncombustive catalytic reaction and utilizing the power for propelling an apparatus, said system comprising:

means for controllably metering a monopropellant fuel into a reaction chamber, the reaction chamber having a catalyst disposed therein such that a chemical reaction between the monopropellant fuel and the catalyst produces heat and gas;

means for utilizing at least a portion of the heat and gas to produce reciprocating motion;

means for transmitting the reciprocating motion to a propulsor such that the propulsor generates motion of the apparatus;

means for utilizing at least a portion of the heat and gas to produce acoustic waves;

means for directing the acoustic waves toward an object external to the apparatus; and means for altering a motion characteristic of the apparatus in response to a determined range of the object, the range of the object being determined by analyzing reflected ones of the acoustic waves.

2. The system of claim 1, wherein the apparatus is configured for flight and the propulsor comprises means for generating lift.

3. A method for producing power through a noncombustive catalytic reaction and utilizing the power for propelling an apparatus, said method comprising:

controllably metering a monopropellant fuel into a reaction chamber, the reaction chamber having a catalyst disposed therein such that a chemical reaction between the monopropellant fuel and the catalyst produces heat and gas;

utilizing at least a portion of the heat and gas to produce reciprocating motion;

transmitting the reciprocating motion to a propulsor such that the propulsor generates motion of the apparatus;

utilizing at least a portion of the heat and gas to produce acoustic waves;

directing the acoustic waves toward an object external to the apparatus; and altering a motion characteristic of the apparatus in response to a determined range of the object, the range of the object being determined by analyzing reflected ones of the acoustic waves.

4. The method of claim 3, wherein the apparatus is configured for flight, the propulsor comprises a pair of wings, and wherein altering a motion characteristic of the apparatus comprises providing gas to a portion of one of said wings such that lift of said one of said wings is altered.

5. The method of claim 3, wherein altering a motion characteristic of the apparatus comprises providing gas to an exhaust of the apparatus such that thrust of the apparatus is increased.

6. An apparatus for generating power from a non-combustive chemical reaction, the power enabling flight of said apparatus, said apparatus comprising:

a reaction chamber having an input port and an output port and being configured to receive monopropellant fuel, said reaction chamber containing a catalyst, said catalyst being chemically reactive with said monopropellant fuel;

a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;

a reciprocating motion-producing mechanism having an intake port and an exhaust port, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable flight of said apparatus, at least a portion of said remaining heat and gas being utilized to influence a flight characteristic of said apparatus during flight;

wherein said reciprocating motion-producing mechanism comprises first and second bellows and a guide bushing disposed therebetween, said first and second bellows being configured to alternately pressurize and vent such that said guide bushing reciprocates along a longitudinal axis between a first position, corresponding to said first bellows being vented and said second bellows being pressurized, and a second position, corresponding to said first bellows being pressurized and said second bellows being vented; and wherein said reciprocating motion-producing mechanism has a self-actuating valve moveable between a first valve position and a second valve position, in said first valve position said self-actuating valve being configured to pressurize said first bellows and vent said second bellows, in said second valve position said self-actuating valve being configured to vent said first bellows and pressurize said second bellows, said guide bushing being configured to initiate movement of said self-actuating valve between said first valve position and said second valve position.

7. The apparatus of claim 6, wherein said monopropellant fuel comprises one of hydrogen peroxide and hydrazine.

8. The apparatus of claim 6, wherein said catalyst comprises a compound including one of silver and platinum.

9. The apparatus of claim 6, wherein said monopropellant is a solution of at least 70% hydrogen peroxide.

10. An apparatus for generating power from a non-combustive chemical reaction, the power enabling flight of said apparatus, said apparatus comprising:
- a reaction chamber having an input port and an output port and being configured to receive monopropellant fuel, said reaction chamber containing a catalyst, said catalyst being chemically reactive with said monopropellant fuel;
- a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;
- a reciprocating motion-producing mechanism having an intake port and an exhaust port, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable flight of said apparatus, at least a portion of said remaining heat and gas being utilized to influence a flight characteristic of said apparatus during flight;
- a wave generator configured to receive at least a portion of said remaining gas from said exhaust port, said remaining gas being under pressure, said wave generator being configured to propagate acoustic waves therefrom in response to receiving said remaining gas; and
- a controller configured to receive transmission information corresponding to acoustic waves transmitted from said wave generator and reception information corresponding to reflected ones of said acoustic waves received by said apparatus, said reflected ones of said acoustic waves being reflected from objects external to said apparatus, said controller being configured to correlate said transmission information with said reception information and generate a control signal in response thereto, said control signal being configured to alter a flight characteristic of said apparatus.

11. An apparatus for generating power from a non-combustive chemical reaction, the power enabling flight of said apparatus, said apparatus comprising:
- a reaction chamber having an input port and an output port and being configured to receive monopropellant fuel, said reaction chamber containing a catalyst, said catalyst being chemically reactive with said monopropellant fuel;
- a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;
- a reciprocating motion-producing mechanism having an intake port and an exhaust port, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable flight of said apparatus, at least a portion of said remaining heat and gas being utilized to influence a flight characteristic of said apparatus during flight;
- a wave generator configured to receive at least a portion of said remaining gas from said exhaust port, said remaining gas being under pressure, said wave generator being configured to propagate acoustic waves therefrom in response to receiving said remaining gas;
- a controller configured to receive transmission information corresponding to acoustic waves transmitted from said wave generator and reception information corresponding to reflected ones of said acoustic waves received by said apparatus, said reflected ones of said acoustic waves being reflected from objects external to said apparatus, said controller being configured to correlate said transmission information with said reception information and generate a control signal in response thereto, said control signal being configured to alter a flight characteristic of said apparatus; and
- wherein said wave generator comprises a resonant cavity and a piston movably arranged therein, said resonant cavity being configured to receive at least a portion of said remaining gas and, in response thereto, generate acoustic waves, a frequency of said acoustic waves corresponding to a position of said piston within said resonant cavity.

12. An apparatus for generating power from a non-combustive chemical reaction, the power enabling flight of said apparatus, said apparatus comprising:
- a reaction chamber having an input port and an output port and being configured to receive monopropellant fuel, said reaction chamber containing a catalyst, said catalyst being chemically reactive with said monopropellant fuel;
- a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;
- a reciprocating motion-producing mechanism having an intake port and an exhaust port, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable flight of said apparatus, at least a portion of said remaining heat and gas being utilized to influence a flight characteristic of said apparatus during flight; and
- a gas bearing configured to receive at least a portion of said remaining gas from said exhaust port, said gas bearing comprising a first surface and a second surface configured to move relative thereto, said first surface having a perforation formed therethrough, said perforation being configured to receive a flow of said remaining gas and direct said flow toward said second surface such that said second surface is urged away from said first surface, thereby reducing friction between said first surface and said second surface.

13. An apparatus for generating power from a non-combustive chemical reaction, the power enabling flight of said apparatus, said apparatus comprising:

a reaction chamber having an input port and an output port and being configured to receive monopropellant fuel, said reaction chamber containing a catalyst, said catalyst being chemically reactive with said monopropellant fuel;

a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;

a reciprocating motion-producing mechanism having an intake port, an exhaust port, a piston, and a spool valve, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable flight of said apparatus, at least a portion of said remaining heat and gas being utilized to influence a flight characteristic of said apparatus during flight, said piston and said spool valve being reciprocatingly engaged within said body, said piston being movable between a first reciprocating position and a second reciprocating position, said spool valve defining a first channel and a second channel and being movable between a first position and a second position, in said first position said spool valve enabling at least a portion of said remaining heat and gas from said exhaust port to pass through said first channel and urge said piston from said first reciprocating position toward said second reciprocating position, in said second position said spool valve enabling at least a portion of said remaining heat and gas from said exhaust port to pass through said second channel and urge said piston from said second reciprocating position toward said first reciprocating position; and a pair of wings, said wings configured to move in response to reciprocating motion of said piston such that said wings generate lift thereby enabling flight of said apparatus.

14. An apparatus for generating power from a non-combustive chemical reaction, the power enabling flight of said apparatus, said apparatus comprising:

a reaction chamber having an input port and an output port and being configured to receive monopropellant fuel, said reaction chamber containing a catalyst, said catalyst being chemically reactive with said monopropellant fuel;

a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;

a reciprocating motion-producing mechanism having an intake port, an exhaust port, a piston, and a spool valve, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable flight of said apparatus, at least a portion of said remaining heat and gas being utilized to influence a flight characteristic of said apparatus during flight, said piston and said spool valve being reciprocatingly engaged within said body, said piston being movable between a first reciprocating position and a second reciprocating position, said spool valve defining a first channel and a second channel and being movable between a first position and a second position, in said first position said spool valve enabling at least a portion of said remaining heat and gas from said exhaust port to pass through said first channel and urge said piston from said first reciprocating position toward said second reciprocating position, in said second position said spool valve enabling at least a portion of said remaining heat and gas from said exhaust port to pass through said second channel and urge said piston from said second reciprocating position toward said first reciprocating position;

a pair of wings, said wings configured to move in response to reciprocating motion of said piston such that said wings generate lift thereby enabling flight of said apparatus; and wherein at least a portion of said remaining heat and gas is directed to said wings for influencing a flight characteristic of said apparatus.

15. An apparatus for generating power from a non-combustive chemical reaction, the power enabling motion of said apparatus, said apparatus comprising:

a reaction chamber having an input port and an output port and being configured to receive monopropellant fuel, said reaction chamber containing a catalyst, said catalyst being chemically reactive with said monopropellant fuel;

a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;

a reciprocating motion-producing mechanism having an intake port and an exhaust port, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable motion of said apparatus, at least a portion of said remaining heat and gas being utilized to influence a motion characteristic of said apparatus;

wherein said reciprocating motion-producing mechanism comprises first and second bellows and a guide bushing disposed therebetween, said first and second bellows being configured to alternately pressurize and vent such that said guide bushing reciprocates along a longitudinal axis between a first position, corresponding to said first bellows being vented and said second bellows being pressurized, and a second position, corresponding to said first bellows being pressurized and said second bellows being vented; and wherein said reciprocating motion-producing mechanism has a self-actuating valve moveable between a first valve position and a second valve position, in said first valve position said self-actuating valve being configured to pressurize said first bellows and vent said second bellows, in said second valve position said self-actuating valve being configured to vent said first bellows and pressurize said second bellows, said guide bushing being configured to initiate movement of said self-actuating valve between said first valve position and said second valve position.

16. An apparatus for generating power from a non-combustive chemical reaction, the power enabling motion of said apparatus, said apparatus comprising:

a reaction chamber having an input port and an output port and being configured to receive monopropellant fuel, said reaction chamber containing a catalyst, said catalyst being chemically reactive with said monopropellant fuel;

a fuel metering device communicating with said input port and being configured to meter said monopropellant fuel into said reaction chamber through said input port of said reaction chamber such that a chemical reaction between said monopropellant fuel and said catalyst occurs, said chemical reaction producing heat and gas, at least a portion of said heat and gas being expelled through said output port of said reaction chamber;

a reciprocating motion-producing mechanism having an intake port and an exhaust port, said intake port communicating with said output port of said reaction chamber, said reciprocating motion-producing mechanism being configured to generate reciprocating motion from said heat and gas expelled through said output port of said reaction chamber and provide remaining heat and gas to said exhaust port, said reciprocating motion being adapted to enable motion of said apparatus, at least a portion of said remaining heat and gas being utilized to influence a motion characteristic of said apparatus;

a wave generator configured to receive at least a portion of said remaining gas from said exhaust port, said remaining gas being under pressure, said wave generator being configured to propagate acoustic waves therefrom in response to receiving said remaining gas; and a controller configured to receive transmission information corresponding to acoustic waves transmitted from said wave generator and reception information corresponding to reflected ones of said acoustic waves received by said apparatus, said reflected ones of said acoustic waves being reflected from objects external to said apparatus, said controller being configured to correlate said transmission information with said reception information and generate a control signal in response thereto, said control signal being configured to alter a flight characteristic of said apparatus.

* * * * *